United States Patent
Demirjian et al.

(10) Patent No.: US 9,424,414 B1
(45) Date of Patent: Aug. 23, 2016

(54) INACTIVE NON-BLOCKING AUTOMATED AGENT DETECTION

(71) Applicant: Amazon Technologies, Inc., Reno, NV (US)

(72) Inventors: Sevag Demirjian, Seattle, WA (US); John Lindsay Bates, Seattle, WA (US); Mark Evans Brighton, Seattle, WA (US); Samuel Charles Goodwin, Seattle, WA (US); Colin James Hawkett, Seattle, WA (US); Blair Livingstone Hotchkies, Bellevue, WA (US); Forrest MacKenzie Vines, Covington, WA (US)

(73) Assignee: Amazon Technologies, Inc., Seattle, WA (US)

( * ) Notice: Subject to any disclaimer, the term of this patent is extended or adjusted under 35 U.S.C. 154(b) by 329 days.

(21) Appl. No.: 14/229,755

(22) Filed: Mar. 28, 2014

(51) Int. Cl.
*G06F 21/36* (2013.01)

(52) U.S. Cl.
CPC .................................... *G06F 21/36* (2013.01)

(58) Field of Classification Search
CPC ................. G06F 21/36; H04L 63/10–63/108
See application file for complete search history.

(56) References Cited

U.S. PATENT DOCUMENTS

| | | | |
|---|---|---|---|
| 6,925,055 B1 | 8/2005 | Erimli et al. | |
| 8,914,878 B2 | 12/2014 | Burns et al. | |
| 2007/0239604 A1 | 10/2007 | O'Connell et al. | |
| 2008/0072293 A1 | 3/2008 | D'Urso | |
| 2008/0281606 A1 | 11/2008 | Kitts et al. | |
| 2009/0138723 A1* | 5/2009 | Nyang | G06F 21/36 713/182 |
| 2010/0095350 A1* | 4/2010 | Lazar | G06F 21/36 726/3 |
| 2011/0029902 A1 | 2/2011 | Bailey | |
| 2011/0035505 A1 | 2/2011 | Jakobsson | |
| 2011/0173453 A1 | 7/2011 | Parsell et al. | |
| 2011/0270969 A1 | 11/2011 | Noh et al. | |
| 2011/0296509 A1* | 12/2011 | Todorov | G06F 21/36 726/7 |
| 2012/0090030 A1 | 4/2012 | Rapaport et al. | |
| 2012/0183270 A1* | 7/2012 | Greenblatt | G06F 21/34 386/224 |
| 2012/0246737 A1* | 9/2012 | Paxton | G06F 21/316 726/27 |
| 2012/0323700 A1* | 12/2012 | Aleksandrovich | G06Q 30/00 705/14.69 |
| 2013/0191641 A1* | 7/2013 | Pai | H04L 63/00 713/176 |
| 2013/0198203 A1 | 8/2013 | Bates et al. | |
| 2014/0172552 A1 | 6/2014 | Raab et al. | |
| 2014/0250538 A1* | 9/2014 | Rapaport | G06F 21/31 726/28 |
| 2014/0278610 A1 | 9/2014 | Carnahan et al. | |
| 2015/0067848 A1 | 3/2015 | Baikalov | |

OTHER PUBLICATIONS

CAPTCHA, "BotDetect CAPTCHA ASP.Net Persistence Requirements & Options FAQ," Jun. 15, 2013, 7 pages retrieved on Jan. 20, 2016, from http://web.archive.org/web/201301615143530/http://captcha.com/doc/aspnet/faq/captcha-persistence-faq.html.

\* cited by examiner

*Primary Examiner* — Matthew Smithers
(74) *Attorney, Agent, or Firm* — Davis Wright Tremaine LLP

(57) ABSTRACT

Online retailers may operate one or more services configured to detect requests generated by automated agents. A CAPTCHA may be transmitted in response to requests generated by automated agents. The CAPTCHAs may be included in a modal pop-up box configured to be displayed by a client application displaying a webpage to a customer of the online retailer. Furthermore, the CAPTCHAs included in the modal pop-up box may be rendered inactive and caused not to be displayed by client application executing the webpage. Rendering the CAPTCHAs inactive may provide an additional signal which may be sued to update one or more automated agent detection models.

20 Claims, 16 Drawing Sheets

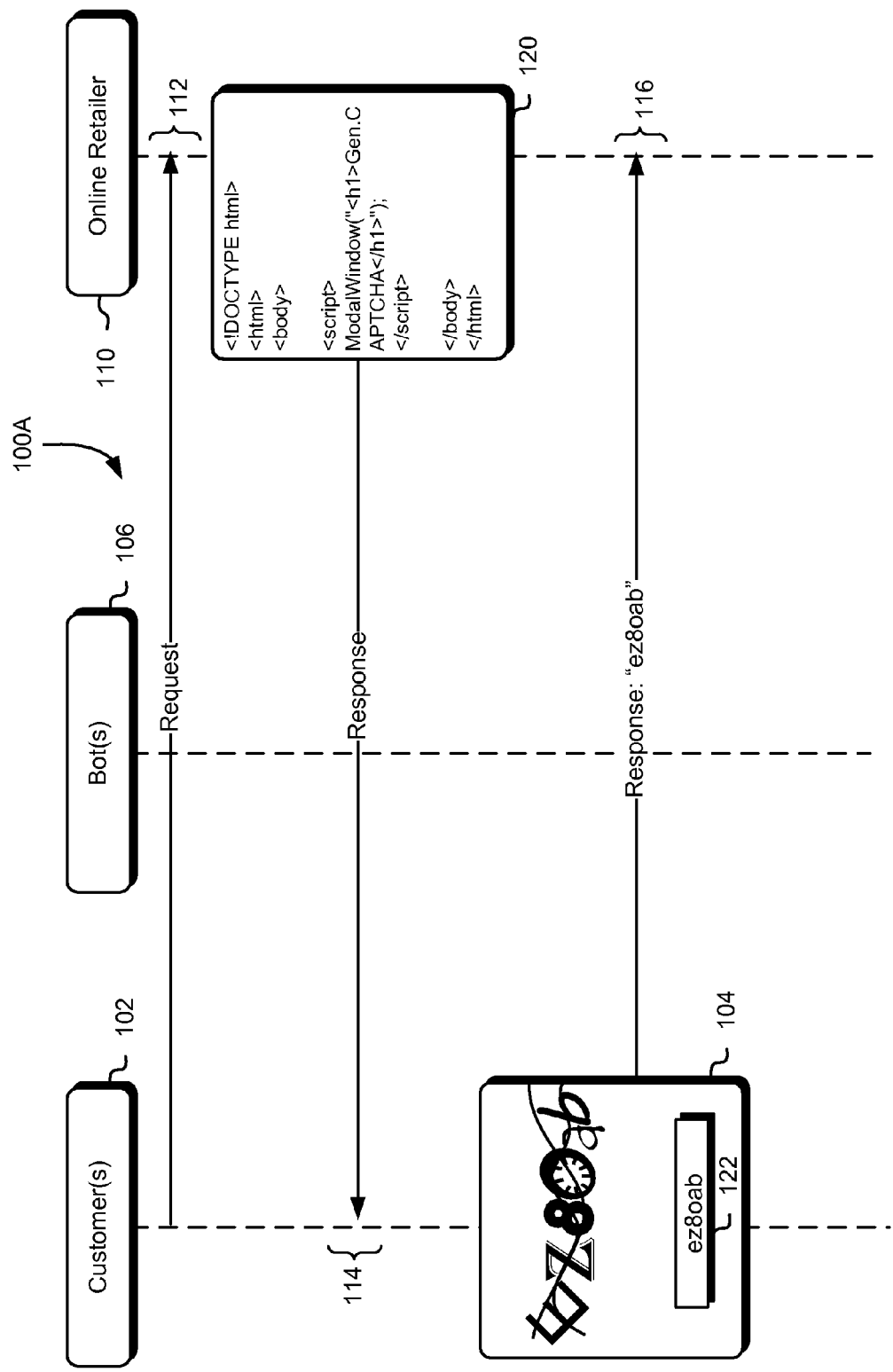

INACTIVE NON-BLOCKING AUTOMATED AGENT DETECTION

BACKGROUND

In modern computing, computer programs that automate human tasks have become more common. Certain computer programs, which are referred to as automated robots or so-called "bots," provide tools that automate tasks, such as crawling through webpages to scan and gather keywords, text and links. Computer programs can also masquerade as humans to gather information from websites, such as customer information, or automatically purchase large quantities of a desired commodity or a commodity being sold at a promotional price. Since a computer program can act automatically and more rapidly than a human, a computer program can compromise data for a large number of accounts or assist a single buyer in purchasing large quantities of a commodity in a short time span.

In a typical completely automated public Turing test to tell computers and humans apart (CAPTCHA), a computer provides an entity attempting to access a network resource with a test, the computer receives a response to the test from the user, and the computer evaluates whether or not the response to the test is correct. A CAPTCHA is designed to provide a test that is relatively simple for a human to solve, but, at the same time, poses a challenge for a computer to decipher. For example, a CAPTCHA might require a user to type letters or digits that appear in an image. Such an image is often distorted in some fashion to hinder a computer from using optical character recognition (OCR) technology to read the letters or digits that appear in the image. As the image is relatively easy to discern by a human, but is difficult for a computer to discern in an automated fashion, a correct solution to the test is presumed to have been submitted by a human.

CAPTCHAs are premised upon the rationale that humans solve visual puzzles more accurately than computers. However, as approaches for automatically circumventing CAPTCHAs have become more sophisticated, computer programs have been able to determine the text or digits within the CAPTCHAs with increased accuracy. To combat this escalation in program sophistication, CAPTCHAs have also evolved in an attempt to improve the security that they provide. Some modern CAPTCHAs provide more sophisticated tests, such as tests that require a user to distinguish real-world features appearing in images. Such a test might require a user to select a particular type of image from a group of images. For example, distinguishing a photograph of a dog from a photograph of a cat is simple for a human to accomplish, but such a task remains relatively difficult for a computer program to solve with consistency.

BRIEF DESCRIPTION OF THE DRAWINGS

Various embodiments in accordance with the present disclosure will be described with reference to the drawings, in which:

FIGS. 1A-1B illustrates a messaging diagram showing CAPTCHA in accordance with various aspects of the present disclosure;

DETAILED DESCRIPTION

Figure 1B:
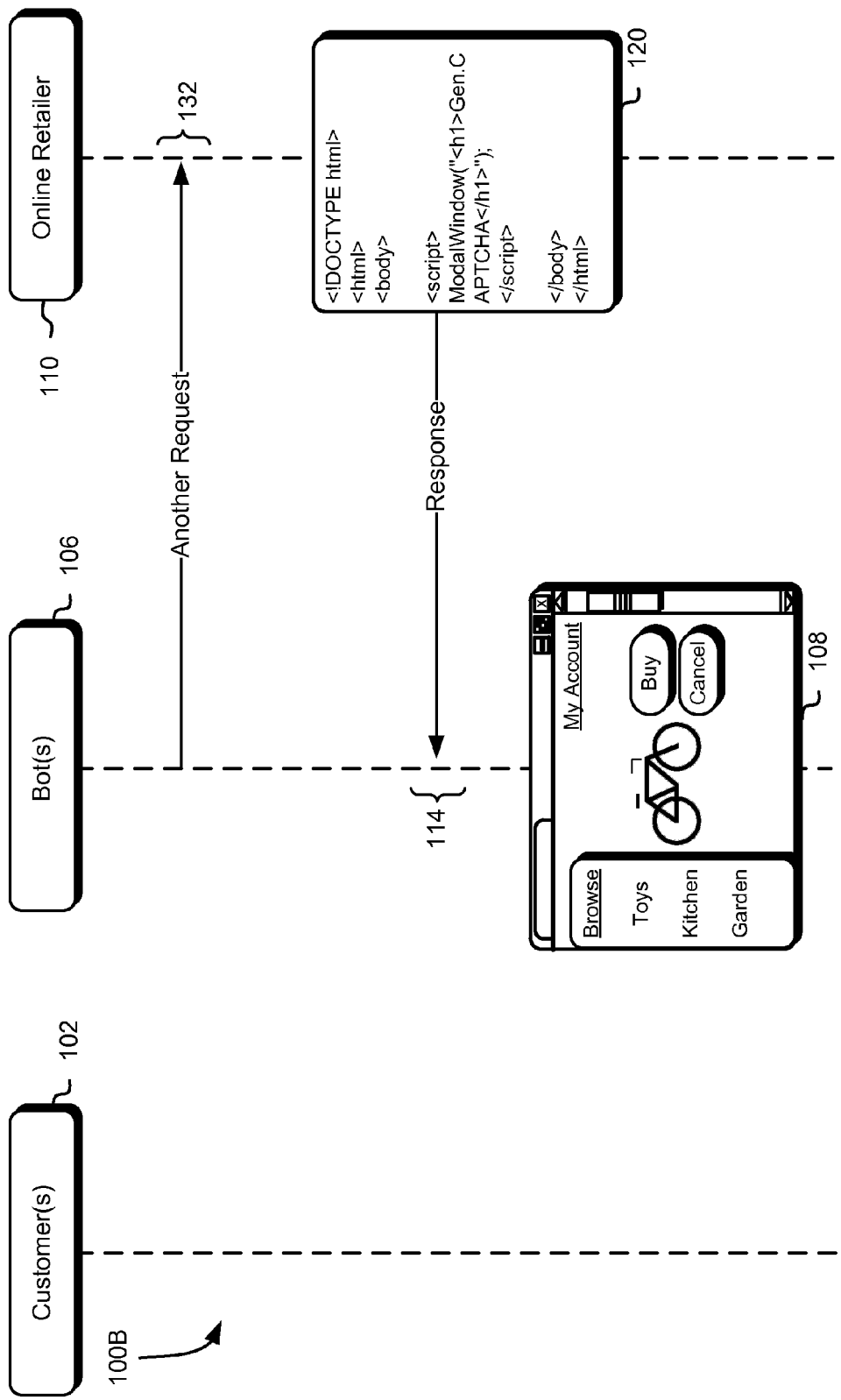

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for differentiating between human requests and automated agent requests received at one or more servers of a system in which, at least in some contexts, interaction with the system by automated agents is undesired. In an embodiment, the system is one of an online retailer and, while an online retailer is used extensively throughout for the purpose of illustration, the techniques described herein are generally applicable to systems that receive or have the potential to receive requests from automated agents. In this particular example, the online retailer may operate an online marketplace from which customers may purchase goods or services. One or more services, such as a bot detection service, of the online retailer may monitor incoming requests and determine, based at least in part on the request and information associated with the request, whether there is a significant enough probability that the request has been submitted by an automated agent (also referred to as a bot) or otherwise check whether the request was submitted by an automated agent should be performed. The information associated with the request may include information corresponding to a customer session, customer purchase history, browser history, number and frequency of the requests, Internet Protocol (IP) address corresponding to the requests, cookie associated with the request, parameter associated with the request, client application responsible for generating the request, behavioral attributes of the requestor, or any other information suitable for determining whether there is a significant enough probability of the request having been submitted by an automated agent. Various machine-learning algorithms may also be used to determine whether there is a significant enough probability of the request having been generated and/or submitted by an automated agent.

Automated agent detection models based at least in part on the request and/or machine-learning algorithms may be subject to false positives (human customers incorrectly classified as automated agents). Numerous signals may be used to determine whether a particular request was generated by human or an automated agent such as JavaScript® activity, purchase history, customer account, browsing history, CAPTCHA or other information suitable for detecting automated agent activity. However, returning a blocking CAPTCHA in response to a request may provide the authors of the automated agents with a clear signal that the automated agents' activities have been detected. A blocking CAPTCHA may be a CAPTCHA whose successful fulfillment is required for access to at least some information, such as at least some webpages of a website.

In some embodiments, returning a non-blocking CAPTCHA in response to automated agent requests, in order to measure the false positive rate, enables the online retailer to collect information associated with the activities of automated agents without compromising the ability to mitigate automated agent requests in the future. The non-blocking CAPTCHA may allow automated agents to continue operations without denial of the requests associated with the operations, while humans (false positives) may be presented with a CAPTCHA challenge, for example, displayed in a modal pop-up box. A modal pop-up box (also referred to as a modal dialog or modal window) may be a child window that requires users to interact with the child window before they can return to operating the parent application, thus preventing the workflow on the application main window. The non-blocking CAPTCHA may be presented to humans, through a client application, as a graphical user interface (GUI) or an element of a GUI requesting certain information despite the webpage including the mechanisms, such as uniform resource locators (URLs), for requesting the information. For example, a webpage may contain certain information that is accessible without fulfillment of the CAPTCHA such that the code of the webpage includes a reference usable to access the information, but the webpage may be presented with the reference being selectable. The non-blocking CAPTCHA, inactive non-blocking CAPTCHA or other security checks described herein may be included in one or more user interface types. The bot detection service or other service may define a particular user interface type, the particular user interface type may include a particular type of security check to be displayed as a result of rendering a user interface of the particular user interface type. An automated agent may request a webpage and receive the requested webpage which includes a non-blocking CAPTCHA, but the webpage containing the requested information may still allow the automated agent to follow the URLs included in the code of the webpage and use the URLs to submit additional requests. A human presented with the same page however would not be able to use the URLs to submit additional requests until the CAPTCHA included in the webpage was completed because the application displaying the webpage to the user would not allow selection of the URLs. URLs are an example of references to information and other techniques for referencing information may be used in accordance with the present disclosure.

The requested webpage may contain additional markup to overlay the modal window with the CAPTCHA challenge using JavaScript®, Cascading Style Sheets (CSS) or other known techniques capable of displaying a pop-up box or dialogue box such that the user is required to interact with the pop-up box or dialogue box. The CAPTCHA may be included in the code of the webpage in such a way that automated agents may ignore the CAPTCHA but the CAPTCHA would still be visible to humans using a client application configured to display information to humans, such as a web browser. The signal returned in response to the modal pop-up may indicate whether the request is associated with a human or automated agent. The signal may include a variety of mechanisms configured to enable the online retailer to track information corresponding to interactions with a webpage including JavaScript®, cookies, causing a page refresh, causing the client application to modify the static return page, causing a header or parameter to be passed back to the online retailer, altering or otherwise modifying flags in the CSS associated with the webpage, monitoring state outside of the webpage or including additional information in a webpage request or URL. For example, if the signal, such as a webpage request, returned includes a response to the CAPTCHA, this may indicate a false positive (i.e., that the response was generated based at least in part on human interaction). This information may be used by the online retailer to update the bot detection service and improve automated agent detection.

In some embodiments, an inactive non-blocking CAPTCHA is returned in response to the request. The inactive non-blocking CAPTCHA may allow humans to continue operations without requiring interaction with the CAPTCHA contained in the response to the request. Automated agents or authors of the automated agent may discover that more favorable treatment of a request may be achieved if there is at least some interaction with the modal pop-up box contained in the non-blocking CAPTHCA. For example, the bot detection service may be configured such that an interaction with the modal pop-up box may reduce the confidence level associated with the particular requestor. The confidence level may indicate the likelihood that the particular requestor is an automated agent. For example, a high confidence level associated with the particular requestor may indicate that one or more signals associated with the particular requestor have been received and that the received signals are likely generated by an automated agent. Authors of the automated agents may discover this and configure the automated agent to render the modal pop-up box so that the automated agent may transmit an interaction with the modal pop-up box to the online retailer. Therefore, it may be advantageous to be able to discriminate between automated agents interacting with the modal pop-up box and humans interacting with the modal pop-up box.

The inactive non-blocking CAPTCHA may allow the online retailer to discriminate between human and automated agent interaction with the non-blocking CAPTCHA. For example, the modal pop-up box described above in connection with the non-blocking CAPTCHA may be rendered inactive or otherwise caused not to be displayed on the client applications used by humans to display the response. However, the automated agent may not be able to detect that the CAPTCHA has been rendered inactive (i.e., not visible to humans) and may submit a solution to the CAPTCHA. Automated agents may attempt to solve the CAPTCHA, such as using optical character recognition (OCR) techniques to extract the text from the CAPTHCA. In another example, automated agent may obtain a solution from a human operator, such as by transmitting to a human the CAPTCHA, obtaining a solution to the CAPTCHA and transmitting the solution to the online retailer. The online retailer may receive the solution and determine that the associated request was likely transmitted by an automated agent since, if the web page was properly rendered, the ability to provide a solution would not have been visible to a user. For example, the online retailer may receive a request for a webpage and determine to include an inactive non-blocking CAPTCHA in the response in order to collect information about the particular requestor responsible for submitting the request. The requested webpage may include additional markup that causes the modal pop-up containing the CAPTCHA to not be displayed. The signal received in response, such as a second HTTP request, may indicate the request is associated with a human or automated agent based at least in part on whether a solution to the CAPTCHA was included in the signal.

In some embodiments, a CAPTCHA cookie (also referred to as a token or security cookie) may be transmitted in response to an interaction with a CAPTCHA regardless of whether the interaction indicates that the request is associated with a human or an automated agent. In various embodiments, CAPTCHA cookies are issued in response to correct solutions to a CAPTCHA and are valid for a period of time or number of uses. CAPTCHA cookies may be issued in response to interactions with blocking CAPTCHA, non-blocking CAPTCHA, inactive non-blocking CAPTCHA or any other mechanism configured to receive human interaction. The CAPTCHA cookie may allow the requestor to transmit the CAPTCHA cookie along with the request and the CAPTCHA cookie may indicate to the online retailer that the request may be processed without blocking access to the requested resources. The online retailer may monitor the use of CAPTCHA cookies and manage the number of CAPTCHA cookies issued. A particular CAPTCHA cookie may be issued in response to an incorrect CAPTCHA solution included in a response to a particular request in order to monitor the use of the CAPTCHA cookie and determine, based at least in part on the use of the CAPTCHA cookie, whether the particular request is associated with a human or an automated agent. For example, an automated agent may share the CAPTCHA cookie with one or more other automated agents and the online retailer may receive multiple requests from different requestors with the same CAPTCHA cookie. This activity may indicate that the CAPTCHA cookie was originally transmitted to an automated agent and the online retailer may update the bot detection service based at least in part on the use of the CAPTCHA cookie.

Non-blocking CAPTCHA, inactive non-blocking CAPTCHA and monitoring the use of CAPTCHA cookies may be used to measure the false positive rate of suspected automated agent traffic. For example, if the false positive rate is within an acceptable threshold, then a blocking action could be triggered to mitigate the unwanted traffic at a future point in time without unveiling to the author of the automated agent that the activity of the automated agent has been detected in the process. This may enable one or more subsets of non-actionable (i.e., low confidence) automated agent traffic identified by the bot detection system to be automatically transitioned into actionable (i.e., high confidence) automated agent traffic. The bot detection system may maintain a list of signatures capable of identifying a request as originating from a particular source, the source may be a human or automated agent. The signature list may be an ordered list where the location of the signature in the list indicates the level of confidence that the signature represents an automated agent. The signature may include information capable of differentiating requestors such as an Internet Protocol (IP) address, cookie, physical address, customer account information, session information, HyperText Markup Language (HTML) parameter or token. The signature list may be used to tag requests enabling other services of the online retailer to process the request. For example, signatures in the top half of the list may indicate with a high confidence that the requests associated with the signature are generated by an automated agent and the signatures in the bottom half of the list may indicate with a low confidence that the requests associated with the signature are generated by an automated agent.

Requests may be received at a request routing service, the request routing service may be responsible for routing requests to the system of service responsible for processing the requests. For example, a Hypertext Transfer Protocol (HTTP) request for a particular webpage may be directed by the request routing server to the particular web server responsible for rendering the particular webpage indicated by the HTTP request. The request routing service may receive a copy of the signature list from the detection service in order to tag traffic. The request routing service may determine, based at least in part on the signature list, whether a particular request matches a signature in the signature list and tag the request according to the location of the signature in the signature list. For example, the request routing service may determine a particular signature is associated with a received request and search the signature list for a match. If the request routing service finds a corresponding signature in the signature list, for example, a signature in the signature list indicating a high confidence level, the request routing service may then tag the request as high confidence automated agent traffic. Once the traffic is tagged, the request routing service may then direct for processing.

The tagged request may be received by a rendering service, the rendering service may be responsible for processing the request and returning a response to the request. The rendering service may also make a service call to a policy service, the service call may include tag information associated with the request. The policy service may determine, based at least in part on the tag information, one or more CAPTCHA actions to take in response to the request. For example, the rendering service may receive a request tagged as high confidence automated agent traffic and transmit a service call to the policy service indicating the received request is high confidence automated agent traffic. The policy service may then determine to include a non-blocking CAPTCHA in the response to the request and transmit this information to the rendering service. The rendering service may then obtain a non-blocking CAPTCHA or other type of CAPTCHA to include in the response to the request. The response may include HyperText Markup Language (HTML), JavaScript®, CSS, executable instructions, commands or other information suitable for causing the display of a CAPTCHA.

The online retailer may receive a signal corresponding to the response and determine whether there is a significant enough probability of the request being submitted by an automated agent. For example, the online retailer may receive a solution to a CAPTCHA included in the modal pop-up box of a non-blocking CAPTCHA. This signal may indicate that the requestor is a human operator and the online retailer may then update the signature list by moving the signature corresponding to the requestor lower in the signature list. The online retailer may also select a set of signatures to test over a period of time in order to determine the false positive rate. For example, the online retailer may select a set of low confidence automated agent signatures to present a non-blocking CAPTCHA to and collect signals in response to the non-blocking CAPTCHA over a period of time. At the expiration of the time period, that online retailer may update the signature list based at least in part on the signals received. The online retailer may then alter the test to present inactive non-blocking CAPTCHA to the selected set of low confidence automated agent signatures. This may allow the online retailer to collect additional signals that may be correlated to better indicate whether a particular signature is associated with a human or automated agent. The online retailer may also, once an automated agent has been detected, obtain information corresponding to the behavior of the automated agent in the past and update the automated agent detection model based at least in part on the past behavior. For example, the online retailer may receive one or more signals associated with a particular signature, the one or more signals indicating a particular level of confidence that the signature is associated with an automated agent. The online retailer may then determine, based on a history corresponding to the signature, particular automated agent behaviors and update the automated agent detection model based at least in part on the determined behaviors.

FIGS. 1A-1B illustrate a messaging diagram 100A and 100B where one or more computer systems running within a computing resource service provider environment, as well as the associated code running thereon, may execute a robot detection service. Service providers may include website operators, online retailers, social network providers, cable providers, online game providers or any entity capable of receiving automated agent traffic. A customer 102 (also referred to as a user) may connect to an online retailer 110 through a computer system client device and may initiate connection with and/or interaction with one or more applications running on a request routing service of the online retailer 110. Furthermore, an automated agent 106 may also connect to the online retailer 110 through the computer system client device and may initiate connection with and/or interaction with one or more applications running on the request routing service or other service of the online retailer 110. The online retailer 110 may provide an electronic marketplace offering goods and services for purchase and/or consumption by customers of the online retailer 110. The command or commands to connect to the online retailer may originate from an outside computer system and/or server, or may originate from an entity, user or process on a remote network location, or may originate from an entity, user or process within the computing resource service provider, or may originate from a user of the computer system client device, or may originate as a result of an automatic process or may originate as a result of a combination of these and/or other such origin entities. In some embodiments, the command or commands to initiate the connection to the online retailer 110 may be sent, without the intervention of the customer 102. For example, an automated agent 106 may attempt to connect to the online retailer 110 through computer system client device.

The customers 102 or automated agents 106 may request connection to the service provider 110 via one or more connections and, in some embodiments, via one or more networks and/or entities associated therewith, such as servers connected to the network, either directly or indirectly. The computer system client device that may request access to the online retailer 110 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, Wi-Fi, cellular network protocols, satellite network protocols and/or others.

The customers 102 may interact with the online retailer using a web browser or other application executed by the computer system client device. To enable the customers 102 to interact with the online retailer 110, the computer system client device may transmit one or more Hypertext Transfer Protocol (HTTP) requests 112 over the network to one or more web servers operated by the online retailer 110. The request may be received by the request routing service and directed to the appropriate web server for responding to the request. The web servers may be responsible for delivering the website and associated content to the customer 102 through the computer system client device in response to the one or more HTTP requests 112 received over the network. The automated agent 106 may also connect to the online retailer using applications executed by the computer system client device, which may or may not be the same computer system client device used by the customer 102 to connect to the online retailer. Furthermore the automated agent 106 itself may be an application programmed to connect to the online retailer 110 and executed by the computer system client device.

The online retailer 110 may operate one or more services configured to detect automated agents 106 such as a bot detection service, described in greater detail below in connection with FIGS. 2A-2C. The online retailer 110 may receive one or more requests over connection and stream, or otherwise cause transmission of, the requests or information contained in the request to the bot detection service. The bot detection service may be responsible for maintaining a signature list of possible automated agent signatures and/or redirecting requests suspected of being generated by an automated agent 106. As requests are received at the request routing service, the requests may be tagged based at least in part on the signature list. For example, the signature list may contain IP addresses associated with a suspected automated agent. The request routing service may tag requests originating for an IP address associated with a suspected automated agent. When a web server or service receives the tagged request 112, it may call a policy service in order to determine if a CAPTCHA 104 should be included in a response 114. If a CAPTCHA is to be included in the response 114, a CAPTCHA service may generate a CAPTCHA (also referred to as a security check) and cause the security check 104 to be transmitted in the response 114 to the request 112. The response 114 may include an HTML file 120 configured to such that a security check 104 included in the HTML file 120 may be displayed by a client device operated by a customer 102 when rendering the HTML file 120. The HTML file 120 may include a script or similar executable code, that when executed by a device, such as the client device, causes the security check 104 to be displayed.

The security check 104 may be a representation of a rendered CAPTCHA and includes a field into which the solution to the CAPTCHA may be entered. The CAPTCHA in the security check 104 may be any mechanism configured to differentiate humans from automated agents. For example, the CAPTCHA may be a game or promotional material that a human may be more likely to interact with. Different client devices operated by customer 102 may render the representation of the security check 104 differently based at least in part on different hardware and software included in the different client devices. The security check 104 is simply a representative of the CAPTCHA rendered by a client device and may not be representative of the CAPTCHA as rendered on all devices. The customers 102 may complete the security check 104 and return a solution to 122 the security check 104 to the online retailer 110 in a response 116.

Referring now to FIG. 1B, the online retailer 110 may receive another request 132, the other request 132 may be received from an automated agent 106. When the automated agent 106 receives the response 114 including the HTML file 120 containing the script associated with the security check 104, the automated agent 106 may not complete the security check 104. The automated agent 106 may receive a webpage 108, the webpage 108 corresponding to the HTML file 120. The automated agent may not execute the script included in the HTML file 120 and therefore the automated agent 106 may not determine that the HTML file 120 includes a modal pop-up box containing security check 104. Furthermore, the automated agent 106 may be configured to simply ignore the script contained in the HTML file 120. The automated agent 106 may execute a headless browser or similar application that is not configured to execute scripts or other executable code included in the HTML file 120. For example, the automated agent 106 may receive the requested HTML file 120 and extract information from the webpage 108 without executing the associated script (e.g., JavaScript®) that causes a security check to be presented in a modal pop-up box. The webpage 108 is a representation of what the automated agent 106 may interpret the html file 120 to represent. The automated agent 106 may not display or cause to be displayed the webpage 108 corresponding to the html file 120. For example, the automated agent 106 may be configured to receive the HTML file 120 and parse the HTML file 120 for the contents of the webpage 108 such as the price for an item included in the webpage 108.

A variety of different security checks 104 may be generated and used to tell the difference between humans and automated agents in accordance with the present disclosure. The security check 104 may include detecting mouse clicks or mouse movements, games, coupons, discount codes, offers for goods or services, purchase of goods or services, obfuscated text, images or any other mechanism for receiving human interaction.

In various embodiments, the security check 104 in FIG. 1A is a non-blocking CAPTCHA, to be described in greater detail below in connection with FIG. 3, the non-blocking CAPTCHA may be treated by automated agents 106 as a standard webpage 108 however human users viewing webpage 108 on a client application executed by the computer system client device may see the security check 104 displayed on top of the webpage 108 in a modal manner. In various other embodiments, the security check 104 may be inactive in web page 108 but may still be included in the code associated with webpage 108. This may cause the security check to not be visible to humans when the webpage is viewed using the client application. However, because the security check 104 is still included in the code associated with webpage 108, automated agents 106 may detect the security check 104 and submit a solution to the security check 104. Inactive non-blocking CAPTCHA is described in greater detail below in connection with FIGS. 4A-4B.

Figure 2A:
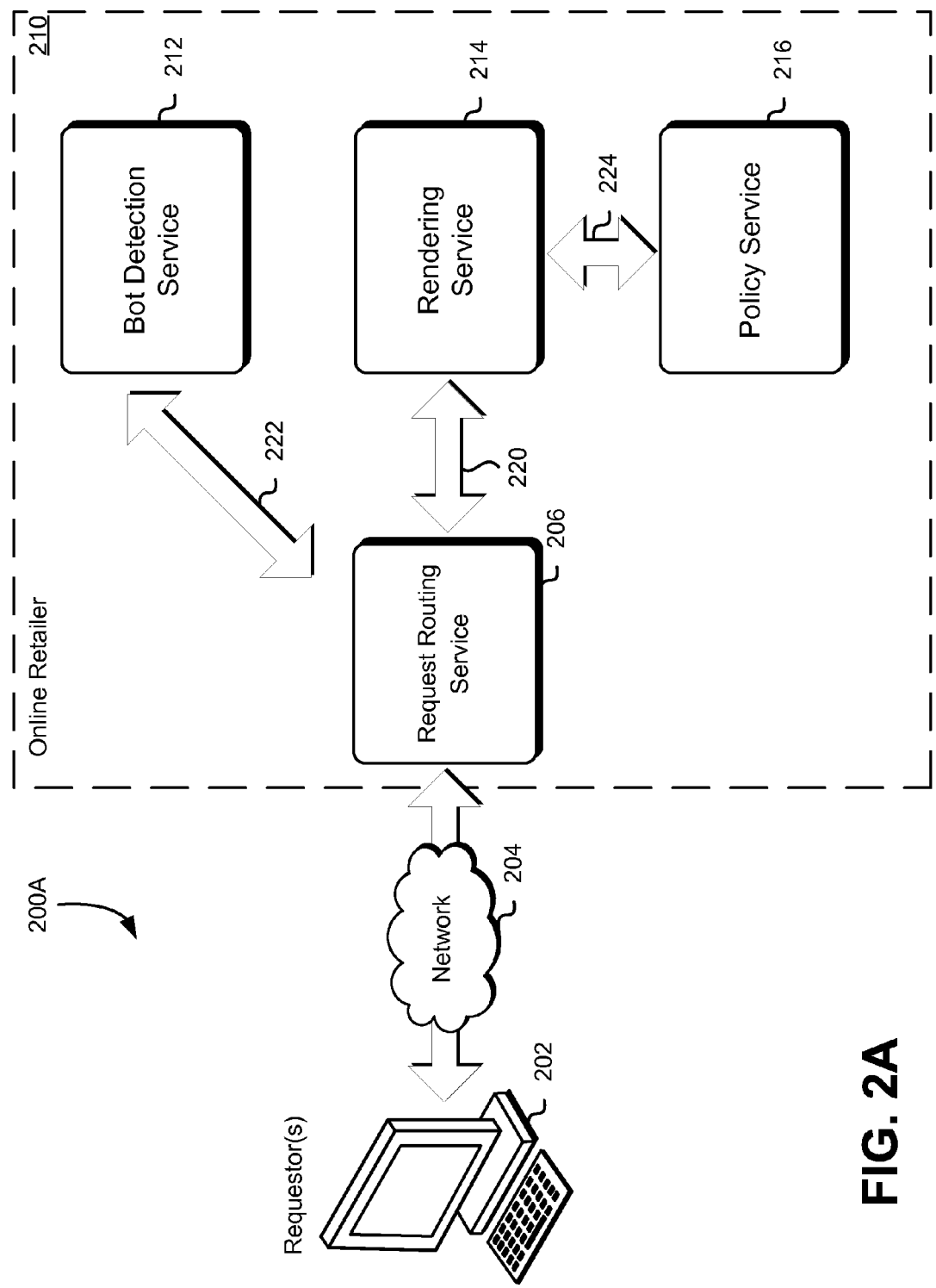
FIGS. 2A-2C illustrates an environment showing an online retailer in accordance with various aspects of the present disclosure.
Figure 2B:
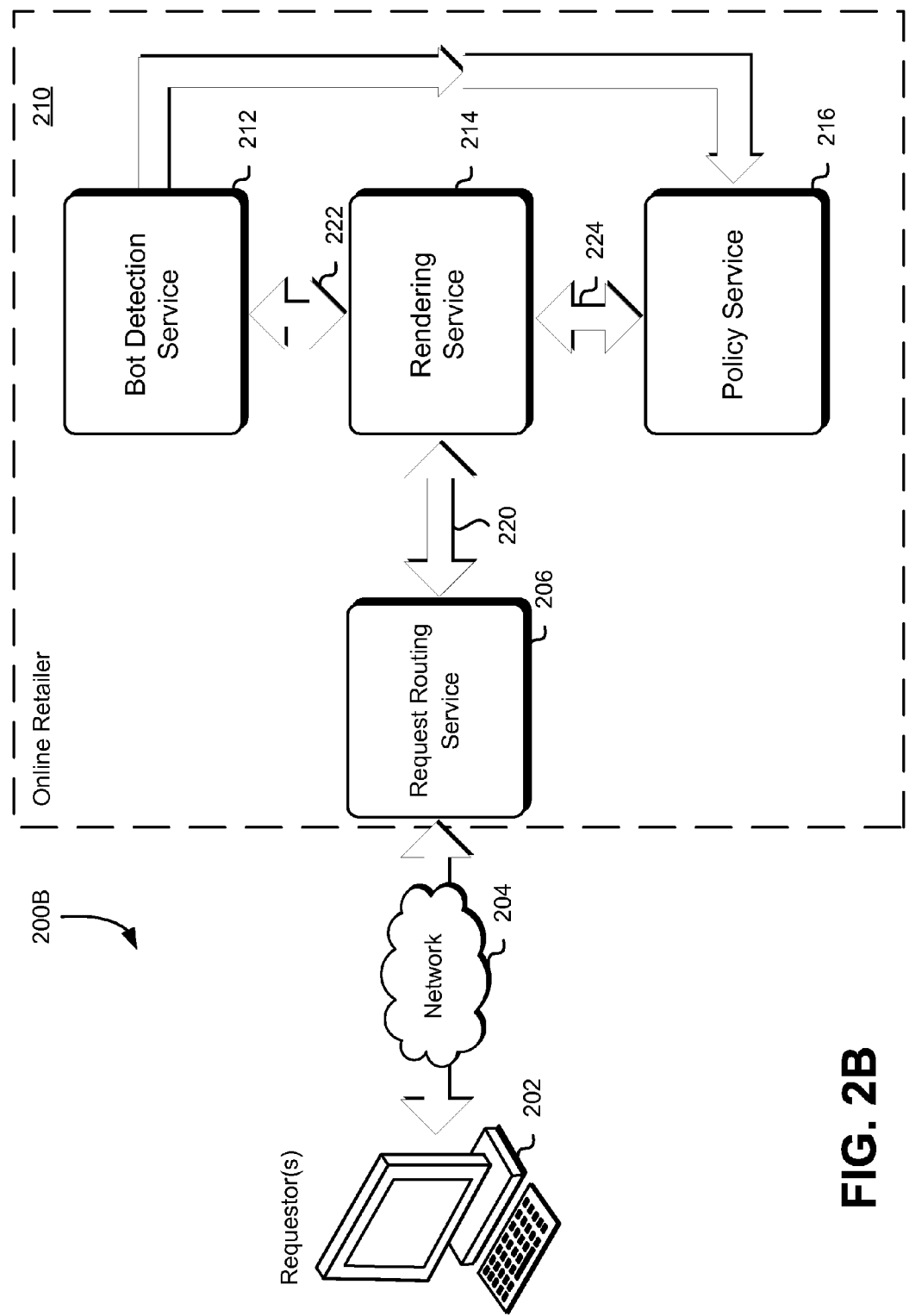
Figure 2C:
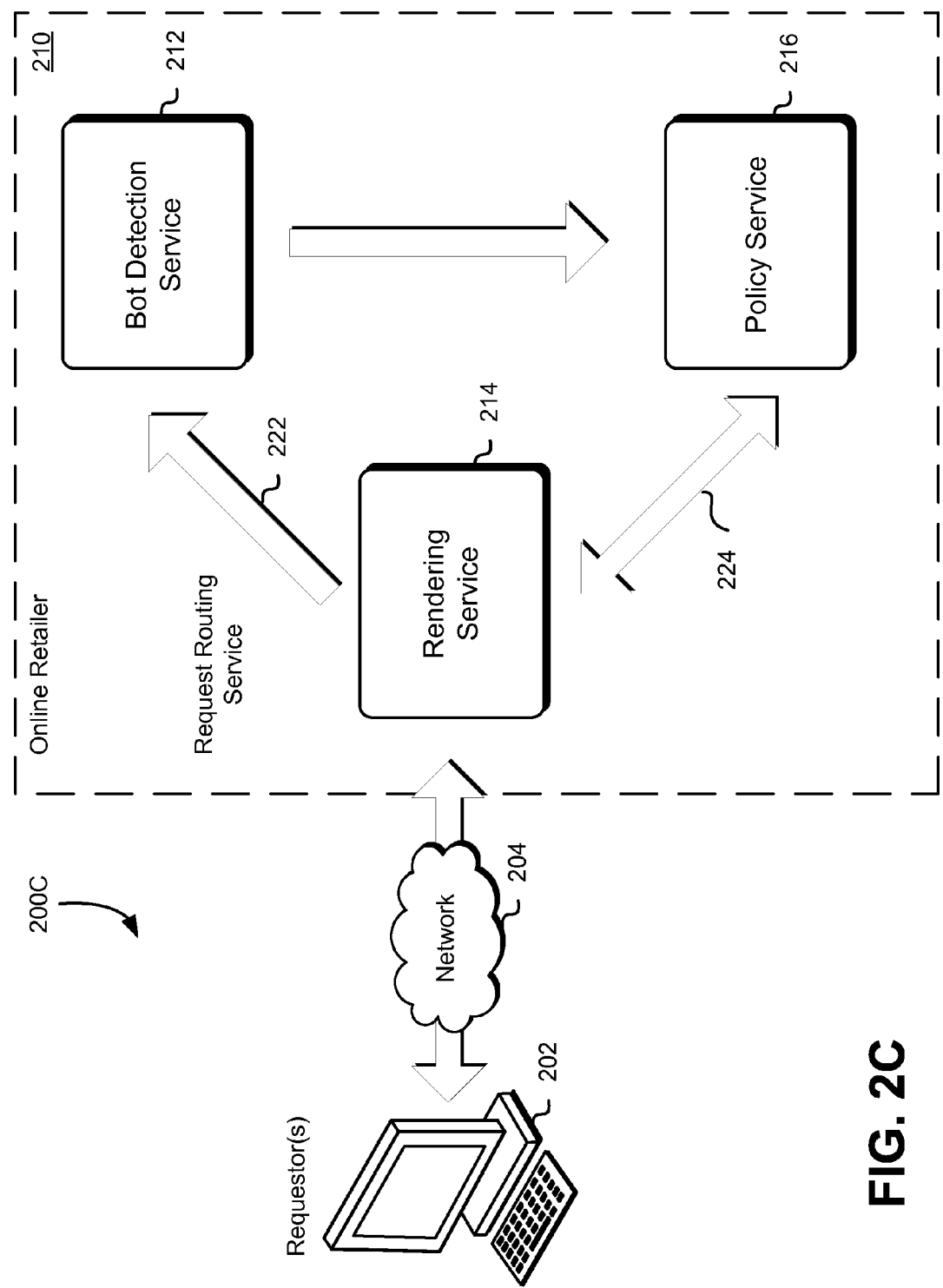

FIGS. 2A-2C show an environment 200A-200C in which requestor(s) 202 may interact with an online retailer 210. The requestor(s) 202 may be automated agents or humans. The online retailer 210 may operate a website that provides an online marketplace where customers 202 may purchase and offer for sale various goods and services. The requestor(s) 202 may transmit requests to access various resources of the online retailer 210. For example, requestor(s) 202 may, using a computing device executing a web browser, navigate the online retailer's 210 website searching for a particular item. The computing device(s) associated with the requestor(s) 202 may transmit one or more HTTP requests to a request routing service 206 of the online retailer 210. The request routing service 206 may be a collection of computing resources collectively configured to receive HTTP requests and direct the HTTP requests to one or more other services of the online retailer. For example, the request routing service 206 may be a collection of computer systems (e.g., servers) located on the edge of the online retailers network 210 configured to direct incoming traffic based at least in part on requests included in the incoming traffic.

The request routing service 206 may direct requests using HTTP redirect or other routing techniques. The request routing service 206 may be responsible for directing requests to the appropriate service of the online retailer 210 for processing. The request routing service 206 may tag requests as low confidence automated agent traffic, high confidence automated agent traffic or the request routing service may not tag the request. The request may be tagged based at least in part on a signature list maintained by a bot detection service 212. The signature list and the bot detection service are described in greater detail below in connection with FIG. 9. The request routing service 206 may transmit information corresponding to the request and the incoming traffic to the bot detection service 212 over a connection 222. The connection 222 may be any suitable connection for transmitting communications between computer systems or within the same computer system such as a network, private network, virtual private network, interprocess communications, service call, function call or other connection. For example, the request routing service 206 may transmit CAPTCHA responses to the bot detection service 212 in order for the bot detection service 212 to determine if the requestors 202 associated with the CAPTCHA responses are humans or automated agents.

In various embodiments, the request routing service 206 may stream and/or transmit requestors' 202 requests to a rendering service 214. In various embodiments, an indication of a request may be transmitted in place of or along with the request. The indications can be the requests themselves or information based at least in part on the requests. The rendering service 214 may be a collection of computing resources collectively configured to generate responses to requests received by the online retailer. For example, the rendering service may be implemented by a web server (or collection of web servers) responsible for transmitting a webpage in response to an HTTP request or similar request. The rendering service may receive tagged or untagged requests from the request routing service 206 over the connection 220. The connection 220 may be any suitable connection for transmitting communications between computer systems or within the same computer system such as a network, private network, virtual private network, interprocess communications, service call, function call or other connection. If the rendering service 214 receives a tagged request, the rendering service 214 may transmit information corresponding to the request or may transmit the request itself to a policy service 216 over a connection 224. The connection 224 may be any suitable connection for transmitting communications between computer systems or within the same computer system such as a network, private network, virtual private network, inter-process communications, service call, function call or other connection. For example, the rendering service 214 may generate a service call to the policy service 216, the service call may include information corresponding to the tagged request such as the signature of the request and associated confidence level.

The policy service 216 may be a collection of computing resources collectively configured to determine one or more CAPTCHA actions to be included in a particular response to a request received from a requestor 202. For example, the policy service may contain a set of rules and corresponding actions to be performed based on the confidence level associated with the tagged request. Furthermore, the policy service may be configured to automatically update the policy information and conduct tests of the detection models used by the bot detection service 212. The policy service 216 may also receive commands from an outside source. For example, a system administrator may manually update the policy information and/or conduct a test of the detection models used by the bot detection service 212. The policy service 216 may determine the one or more CAPTCHA actions based on the tag received from the rendering service 214. The one or more CAPTCHA actions may include actions that do not involve a CAPTCHA such as blocking access to the request resource or providing access to the requested resource. The policy service may also determine that a non-blocking CAPTCHA or an inactive non-blocking CAPTCHA is to be included in the response to the request.

The bot detection service 212 may be a collection of computing resources collectively configured to receive requests and generate, based at least in part on information corresponding to the requests, a score corresponding to the probability or likelihood that the requests were generated by an automated agent. The generated score may be used to maintain an ordered list of signatures corresponding to suspected automated agents. The bot detection service 212 may be a computer system configured to correlate information received corresponding to the activities of the requestors 202 and determine, based at least in part on the received information, a confidence level that the requestor is an automated agent. The bot detection service 212 may receive signals, from the request routing service 206, corresponding to responses to requests from the requestors 202. For example, the policy service 216 may determine to include a non-blocking CAPTCHA in response to a particular request from a requestor 202 and the rendering service 214 may transmit a response to the requestor 202 including the non-blocking CAPTCHA. The webpage including the non-blocking CAPTCHA may be configured such that, to a human, it appears as solving the CAPTCHA allowed access to the reference information contained in the webpage, however the reference information was accessible through the code of the webpage, which was not displayed to the user.

In various embodiments, the response to the requestor 202 is a webpage including a non-blocking CAPTCHA where the webpage may not contain any URLs or other information linking to information for which successful solution to the CAPTCHA is required. The request routing service 206 may then receive from the particular requestor a signal corresponding to the response transmitted by the rendering service 214. The signal may indicate that the requestor did not provide a solution to the non-blocking CAPTCHA. The request routing service 206 may then transmit the signal to the bot detection service 212 and the bot detection service may increase the confidence level to reflect the likelihood that an automated agent is associated with the particular requestor 202. The signal may be generated by the requestor in various ways including JavaScript®, a cookie, causing a page refresh, causing the client application to modify the static return page, causing a header or parameter to be passed back to the online retailer 210, including different flags in the CSS associated with the response or other mechanism capable of monitoring the state outside of the response.

The bot detection service 212 may also receive the requests or copies of the requests and determine a probability of a particular request being generated by an automated agent. The bot detection service 212 may determine the probability of a particular request being generated by an automated agent contemporaneously with receiving the request from the request routing service 206. While probabilities are used for illustration purposes, different calculations may be performed in accordance with the present disclosure, such as calculations calculated so as to generate a score for each request, where the scores are correlated to the probability of the request having been generated by an automated agent. The bot detection service 212 may also monitor requests over a period of time in order to determine the probability of the request being generated by an automated agent. For example, the bot detection service 212 may monitor all of the requests from a particular customer's current session and determine the probability of the requests being generated by an automated agent.

The bot detection service 212 may determine the probability of a particular request(s) being generated by an automated agent and associate the probability with the request. In various embodiments, the bot detection service 212 receives a copy of the request and returns, to the request routing service 206, the probability of the request being generated by an automated agent and information identifying the request. The bot detection service 212 may transmit the request and the associated probability to the request routing service 212 and the request routing service 212 may determine how to process the request based at least in part on the associated probability. The bot detection service 212 may also redirect the request to the rendering service 214 based at least in part on the probability of the request being generated by an automated agent. The bot detection service 212 may also generate a list of possible automated agents based at least in part on the information received from the request routing service 206. The list may be configured to include information identifying the request and/or the requestor as well as a score indicating the likelihood of the request being generated by an automated agent. The identifying information may include a signature based at least in part on the IP address of the requestor, a cookie associated with the request, a token associated with the request, a parameter associated with the request, a customer account associated with the request, a session associated with the request, an identification number associated with the request, purchase history associated with the request or other information capable of identifying a requestor associated with a request.

The request routing service 206 may receive information from the bot detection service 212 corresponding to the requests transmitted from requestors 202. The information may include an update to the signature list or a new signature list. The request routing service 206 may then redirect the requests based at least in part on the information received from the bot detection service 212 or perform some other mitigating action. For example, the request routing service 206 may receive information from the bot detection service 212 indicating that one or more requests may have been transmitted by an automated agent. The request routing service 206 may then tag at least one of the one or more requests before routing the request to the rendering service 214. The rendering service 214 may obtain a security check configured to determine if the request was generated by a human or an automated agent based at least in part on the policy service 216.

The bot detection service 212 and other services illustrated in FIGS. 2A-2C may also be offered as a service to one or more users or organizations of users such that the one or more users or organizations of users may mitigate automated agent activity. For example, an organization may operate a website using one or more computing resources of the online retailer, the online retailer may further offer the bot detection service 212 and/or the policy service 208 as a service to the organization. The organization may then provide security checks to users of the website in order to differentiate human users of the website and automated agents as described in the present disclosure. Users of the website may consent to allowing the online retailer and one or more users or organizations of users to share information corresponding to the users of the website. This information may be used by the bot detection service 212 to detect the activity on automated agents on the organization website.

FIGS. 2A-2C represent alternative configurations of the services and computer systems described herein. The various configurations illustrated by FIGS. 2A-2C may be combined or portions of the configurations may be combined in specific embodiments. For example, the bot detection 212 service may communicate with the other services of the online retailer 210 through the request routing service 206. In another example, the rendering service 214 may transmit signals received from requestors 204 to the bot detection service 212, the bot detections service 212 may determine based at least in part on the received signals one or more updates to the policy service 216. Furthermore, the request routing service 206 may be replaced or incorporated into the rendering service 214.

Figure 3:
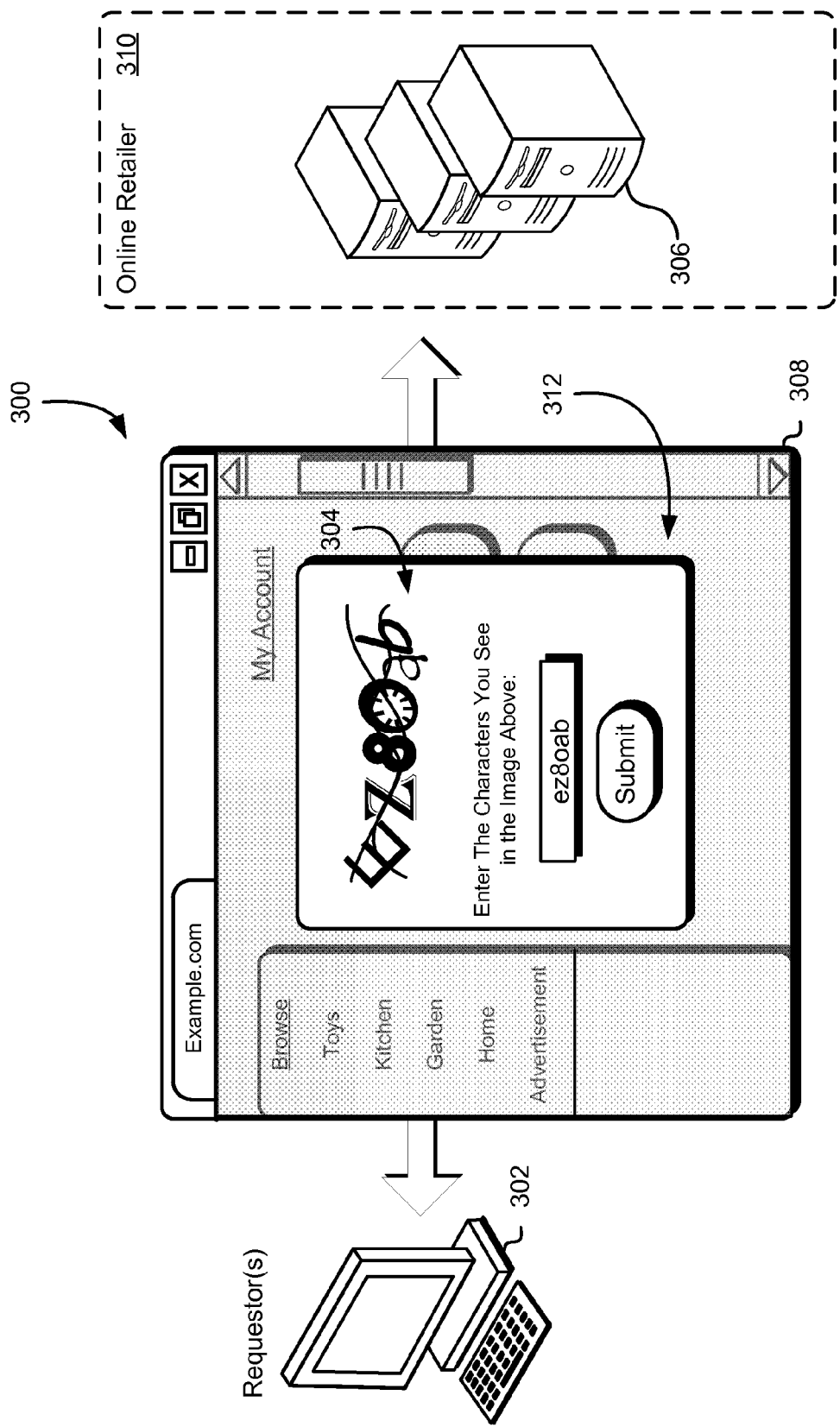
FIG. 3 illustrates an environment showing CAPTCHA in accordance with various aspects of the present disclosure.

FIG. 3 illustrates an example environment 300 where one or more computer systems running within a computing resource service provider environment, as well as the associated code running thereon, may provide in response to a request a non-blocking CAPTCHA in order to detect automated agent activity. A requestor 302 (which may be a human or automated agent) may connect to an online retailer 310 through a computer system client device and may initiate connection with and/or interaction with one or more applications running on a request routing service 306 of the online retailer 310. FIG. 3 further illustrates a webpage 308 including a non-blocking CAPTCHA that may be displayed by an application executed by a computing device enabling a customer to interact with an electronic commerce website operated by an online retailer. As illustrated in FIG. 3, the webpage 308 includes various graphical user interface elements that enable navigation throughout the electronic commerce website of which the webpage 308 is a part. The webpage 308 may be displayed by various applications, such as a mobile application, web browser, stand-alone client, mobile browser or other application configured to communicate with the online retailer 310. In this example, the webpage 308 includes various navigational features which are rendered inactive or otherwise blocked by a modal pop-up box 312. For instance, on the left-hand side of the webpage 308, various links may link to one or more other webpages that contain additional content corresponding to department pages and/or category pages. In this example, the links appear as textual words which enable the links to be selected using an appropriate input device such as a keyboard, mouse, touchscreen or other input device. Selection of one of the links may cause an application displaying the webpage 308 to submit, pursuant to a URL associated with the selected link by the programming of the webpage 308, an HTTP request for the content associated with the link to a server that provided the webpage 308 or another server.

However, the modal pop-up box 312 may be configured such that the selection of the links is blocked or the links may be rendered inactive while the modal pop-up box is displayed. In this example, the webpage 308 also includes a security check 304 contained inside the modal pop-up box 312. In various embodiments, alternatives to the modal pop-up box 312 are used, for example, URLs are simply hidden from display without using the modal pop-up box 312. For example, the URLs may be covered with an image or placed in a location of webpage 308 that human users are unlikely to discover, the URLs may be attached to pixel-sized images or images that are unlikely for a human user to interact with. The modal pop-up box 312 and the security check 304 may be included as markup or executable code included in the response to the request from the requestor 302. In this example, the webpage 308 also includes a graphical user element configured as a "submit" button inside the modal pop-up box. The submit button 304 may be a graphical user interface element of the webpage 308 where the underlying code of the webpage 308 is configured such that selection by an input device of the submit button causes information corresponding to the security check 304 displayed on the webpage 308 to be transmitted to one or more servers of the online retailer. This information may be a signal indicating that the requestor 302 is likely a human and cause the bot detection service or other service of the online retailer to lower the confidence level associated with the particular requestor 302. In some embodiments, the security check 304 contained inside the modal pop-up box 312 must be solved correctly before interaction with the rest of webpage 308 is allowed. In other embodiments, the modal pop-up box 312 may be closed or otherwise cleared with fulfillment of the security check 304 contained in the modal pop-up box.

The webpage 308 may also include a graphical user element configured as a "cancel" button and a graphical user element configured as a close button. The cancel button and close button may be a graphical user interface element of the webpage 308 where the underlying code of the webpage 308 is configured such that selection by an input device of the cancel causes the application displaying the webpage 308 to remove the modal pop-up box 312 and enable operation of the underlay webpage 308. As illustrated in FIG. 3, any interaction with the modal pop-up box 312 may be received as a signal by the request routing services 306 of the online retailer that the requestor is likely a human. Conversely, if the request routing service 306 receives a signal indicating that no interaction occurred with modal pop-up box 312, the signal may indicate that the requestor is likely an automated agent.

In this example, the modal pop-up box 312 contains a security check 304 with obfuscated text requiring the requestor to enter the text displayed in security check 304. Other variations of the security check may be used in accordance with the present disclosure. For example, the security check 304 may be a game, a discount code, a coupon, a media clip, a purchase request, a survey or other mechanism configured to receive human interaction.

The webpage 308 may be caused to be displayed for a variety of reasons as described above in connection with FIG. 2. For example, the webpage 308 including modal pop-up box 312 may be displayed because the bot detection service indicated to the request routing service that a request from the requestor 302 may have been generated by an automated agent. In another example, webpage 308 including modal pop-up box 312 may be displayed because the signature list included in the request routing service 306 indicated that the request or requestor may be an automated agent. The signature list may indicate that the request or requestor may be an automated agent with a high confidence, low confidence, within a particular confidence range or indication corresponding to the request or requestor included in the signature list.

The webpage 308 may also be displayed for a variety of other reasons. For example, the request routing service may require a CAPTCHA or other security check to be inserted into the webpage 308 at random, after processing a number of requests, at a particular time of day or year, at a particular sampling rate or any other reason suitable for mitigating automated agent activity. Completion of the security check displayed on the modal pop-up box 312 may cause the request to be processed by one or more services or servers of the online retailer and a cookie to be returned along with the processed request. In various embodiments, the cookie may be transmitted to the requestor 302 even if the security check 304 is not completed, is completed unsuccessfully or if no interaction with the modal pop-up box 312 occurs. The use of the cookie may then be tracked and used to further refine the bot detection models used by the bot detection service. Monitoring and tracking the use of cookies is described in greater detail below in connection with FIG. 8.

The security check 304 displayed in the modal pop-up box 312 of webpage 308 may be pre-generated and stored in one or more storage systems of the online retailer 310 or may be generated upon receipt of the redirected request by the rendering service or another service of the online retailer 301. The security check 304 may also be partially pre-generated and completed upon receipt of the redirected request. For example, the rendering service may generate a framework for the security check 304 including placeholders for items and text-entry fields where the response to the security check may be entered. Upon receipt of the request the rendering service may determine, based at least in part on information associated with the request, the items to include in the security check.

Figure 4A:
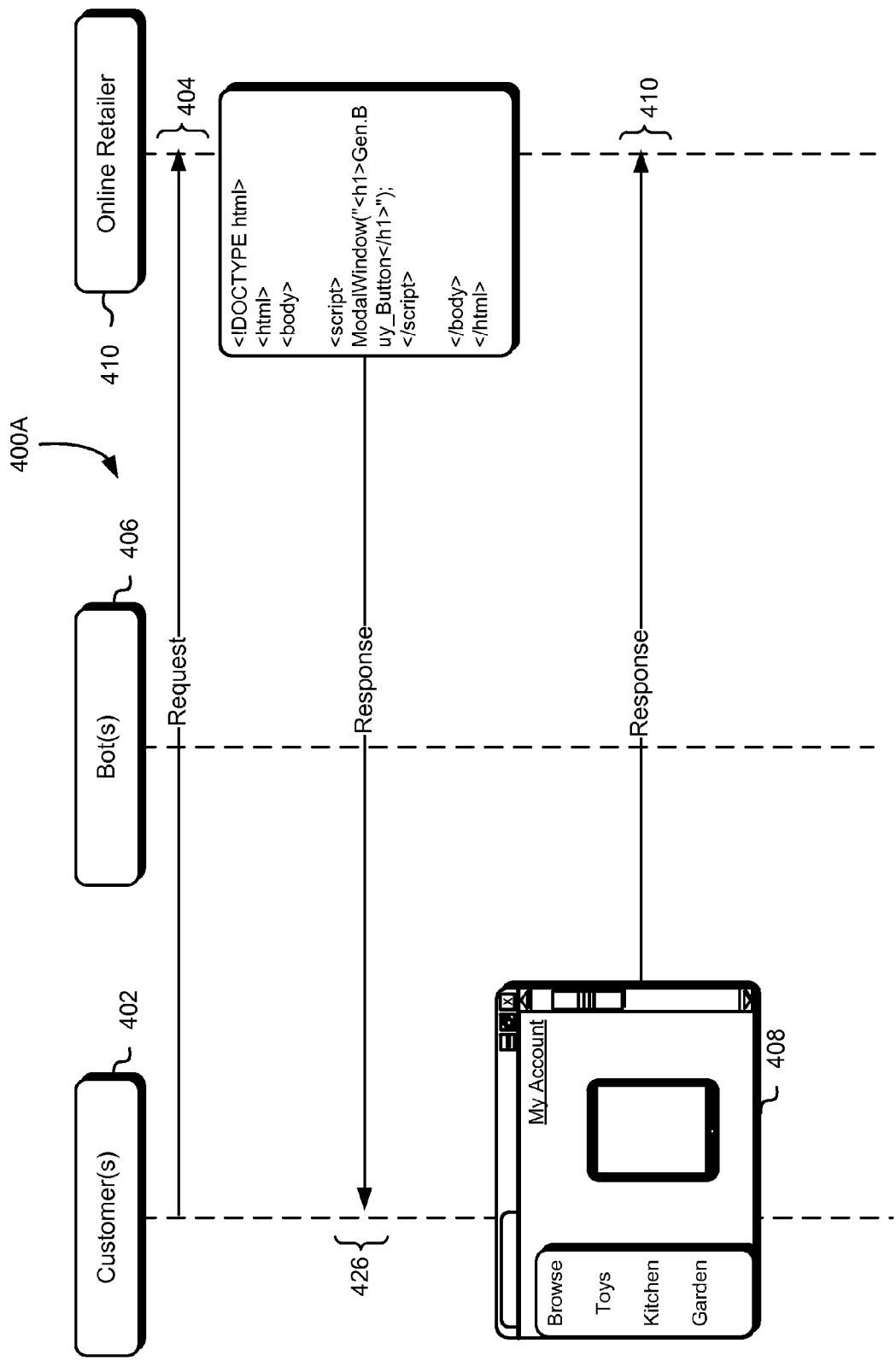
FIGS. 4A-4B illustrates a messaging diagram showing CAPTCHA in accordance with various aspects of the present disclosure.
Figure 4B:
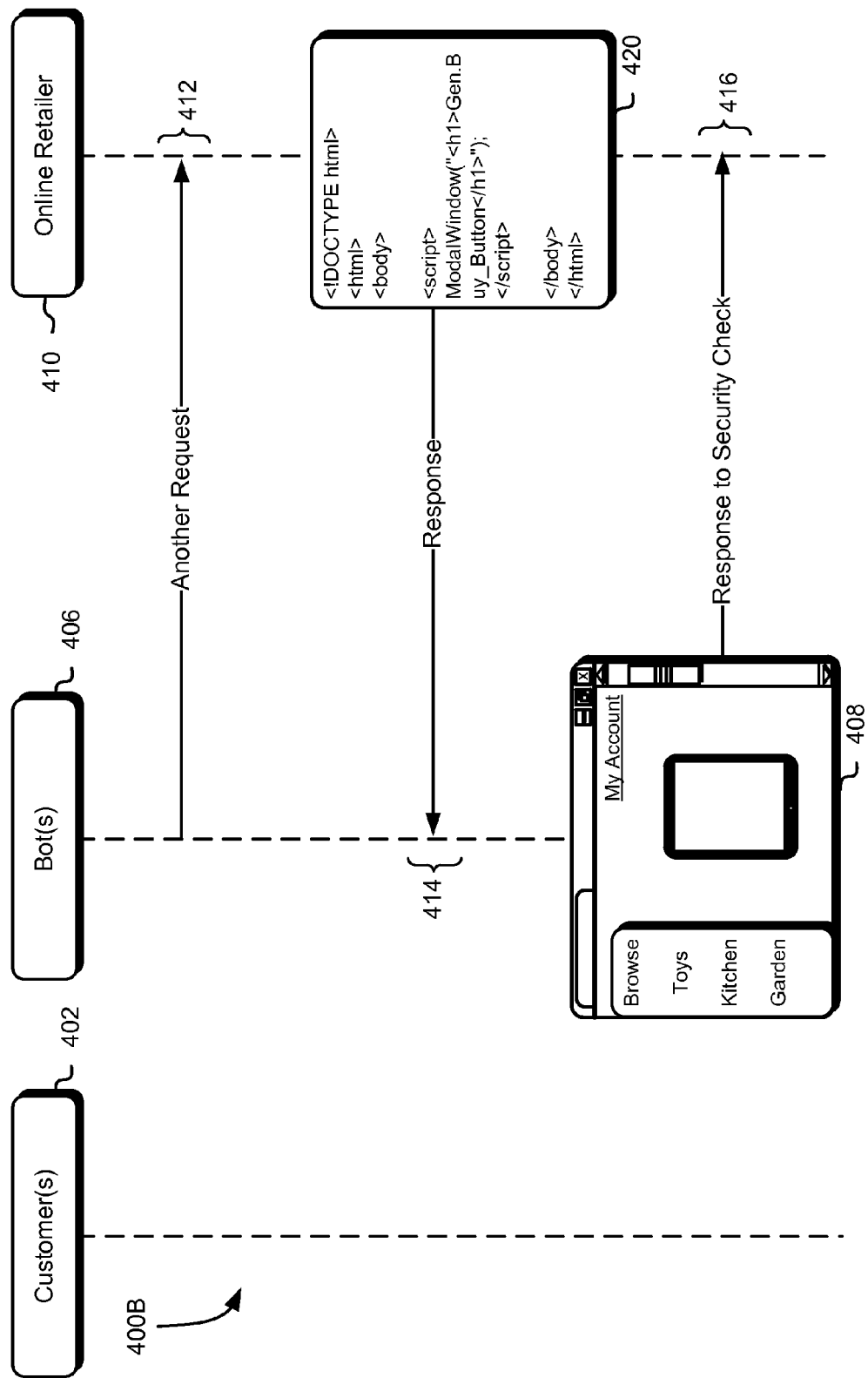

FIGS. 4A-4B illustrate a messaging diagram 400A-40B where one or more computer systems running within a computing resource service provider environment, as well as the associated code running thereon, may provide in response to a request an inactive non-blocking CAPTCHA in order to detect automated agent activity. A customer 402 may connect to an online retailer 410 through a computer system client device and may initiate connection with and/or interaction with one or more applications running on a request routing service of the online retailer 410. The inactive non-blocking CAPTCHA displayed in webpage 408 of FIG. 4A may be displayed in connection with one or more tests executed by the online retailer 410 in order to collect information regarding the activity of automated agents on the electronic marketplace operated by the online retailer 410. For example, the online retailer 410 or a service of the online retailer 410 may select a set of traffic to present with a non-blocking CAPTCHA, as described above in connection with FIG. 3. The non-blocking CAPTCHA may be presented to the set of traffic for a period of time. The set of traffic may be a subset of the low confidence robot traffic. After the expiration of the period of time for presenting the non-blocking CAPTCHA, the online retailer 410 may present the same set of traffic as the inactive non-blocking CAPTCHA in order to receive additional information about the traffic set which may be used to further refine the signature list and detect requests generated by automated agents. If the online retailer 410 then receives solutions to the inactive CAPTCHA, the online retailer 410 may obtain a signature for the particular customer 402 or automated agent 406 and increase the confidence level to reflect the likelihood that an automated agent is associated with the signature of the particular customer 402 or automated agent 406.

Inactive non-blocking CAPTCHAs may be presented in response 426 to requests 404 for a variety of reasons including at random, at a particular sampling rate, in response to signals received from the customer 402 or automated agent 406 or for any other reason suitable for collection information about automated agents 406. For example, the online retailer 410 may, after presenting the non-blocking CAPTCHA to a set of traffic, receive an increased number of CAPTCHA solutions or an increased number of CAPTCHA cookies. In response to the increased number of CAPTCHA solutions or an increased number of CAPTCHA cookies, the online retailer 410 may present the inactive non-blocking CAPTCHA in order to determine the false positive rate and update the signature list. Furthermore, customers 402 interacting with the online retailer 410 may receive a security check 404 presented in a modal pop-up box. The security check may include a purchase option as illustrated in FIG. 4A. The online retailer may receive a response 410 indicating an interaction with the security check 404. The online retailer 410 may then update the signature list or the automated agent detection model used to generate the signature list based at least in part on the response. The signature list may be updated by modifying the confidence level associated with the particular signature, such as decreasing the confidence level.

In various embodiments, the webpage 408 may include a security check contained in a modal pop-up box configured such that the selection of the links is blocked or the links may be rendered inactive while the modal pop-up box is displayed. The security check may also include a "buy" button included inside the modal pop-up box. The buy button and other information included in the modal pop-up box may allow a customer 402 of the online retailer 410 to complete a transaction on the electronic commerce website operated by the online retailer 410. The modal pop-up box, the buy button and other purchase information may be included as markup or executable code included in the response to the request from the customer 402 or automated agent 406. The security check may also include various graphical user elements contained inside the modal pop-up box that may indicate that the request generated by the customer 402 may have been generated based at least in part by a human actor. As described above in connection with FIG. 3, the information included in the modal pop-up box may be configured such that a client application operated by a human would display the information in the modal pop-up box, however an automated agent 406 receiving the same modal pop-up box may not parse or render the information contained in the modal pop-up box.

The security check may also include a graphical user interface element configured as a "cancel" button and a graphical user interface element configured as a "close" button. The cancel button and close button may be graphical user interface elements of the security check where the underlying code of the security check is configured such that selection by an input device of the cancel button causes the application displaying the security check to remove the modal pop-up box and enable operation of the underlay webpage. Any interaction with the modal pop-up box may be received as a signal by the request routing services of the online retailer 410 that the requestor is likely a human. Conversely, if the request routing service receives a signal indicating that no interaction occurred with the modal pop-up box, the signal may indicate that the requestor is likely an automated agent 406.

FIGS. 4A-4B further illustrate a webpage 408 including an inactive non-blocking CAPTCHA. In various embodiments, the webpage 408 illustrates what an automated agent parses and collects from a response including a non-blocking CAPTCHA. As illustrated in FIGS. 4A-4B, the webpage 408 includes various graphical user interface elements that enable navigation throughout the electronic commerce website of which the webpage 408 is a part. The webpage 408 may be displayed by various applications, such as a mobile application, web browser, stand-alone client, mobile browser or other application configured to communicate with the online retailer 410. In this example, the webpage 408 may include code for a modal pop-up box, containing a security check, which is rendered inactive or otherwise configured such that a client application displaying the webpage 408 would not display the modal pop-up box. The CAPTCHA contained in the webpage 408 may be considered non-blocking because an automated agent may receive the webpage 408 in response to a request for one or more resources of the online retailer 410 without being restricted or blocked.

Referring now to FIG. 4B, automated agents 406 may transmit requests 412 to the online retailer 410 and receive in response to the request 412 a response 414 including an inactive non-blocking CAPTCHA. The automated agents 406 may receive the response 414 and determine based at least in part code associated with the response 414 that a security check is included in the response 414. The automated agent 406 may then return a response to the security check 416 included in the response 414. The online retailer 410 may receive the response to the security check 416 and determine the response was provided by an automated agent 406 based at least in part on the inactive non-blocking CAPTCHA 408 transmitted to the automated agent 406. For example, the response 414 may include an HTML file 420 containing scripts or similar executable code that when executed provide a security check, however the response 414 may be configured such that the client application executed by the client device operated by the customer 402 would not execute the scripts and therefore the client device would not display the security check to the customer 402. Therefore, if the online retailer 410 receives a response to the security check 416, the online retailer 410 may determine based at least in part on the received response that the response was provided by an automated agent 406.

FIGS. 4A-4B further illustrate a webpage 408 including a non-blocking CAPTCHA which may be displayed by an application executed by a computing device enabling a customer to interact with an electronic commerce website operated by an online retailer 410. In this example, the webpage 408 includes various navigational features which are rendered inactive or otherwise blocked by a modal pop-up box. For instance, on the left-hand side of the webpage 408, various links may link to one or more other webpages that contain additional content corresponding to department pages and/or category pages. In this example, the links appear as textual words which enable the links to be selected using an appropriate input device such as a keyboard, mouse, touchscreen or other input device. Selection of one of the links may cause an application displaying the webpage 408 to submit, pursuant to a URL associated with the selected link by the programming of the webpage 408, an HTTP request for the content associated with the link to a server that provided the webpage 408 or another server.

In this example, the modal pop-up box contains a purchase option for the item displayed in the webpage 408. Other variations may be used in accordance with the present disclosure. For example, the modal pop-up box may contain a game, a discount code, a coupon, a media clip, a security check, a survey or other mechanism configured to receive human interaction.

The webpage 408 may be caused to be displayed for a variety of reasons as described above in connection with FIGS. 2A-2C. For example, the webpage 408 including the modal pop-up box may be displayed because the bot detection service indicated to the request routing service that a request may have been generated by an automated agent 406. In another example, webpage 408 including modal pop-up box may be displayed because the signature list included in the request routing service indicated that the request or requestor may be an automated agent 406. The signature list may indicate that the request or requestor may be an automated agent 406 with a high confidence, low confidence, within a particular confidence range or indication corresponding to the request or requestor included in the signature list. The webpage 408 may further be configured to display the modal pop-up box when a customer attempts to consume an item offered for sale by the online retailer.

The webpage 408 may also be displayed for a variety of other reasons. For example, the request routing service may redirect the request to the CAPTCHA service at random, after processing a number of requests, at a particular time of day or year, at a particular sampling rate or any other reason suitable for mitigating automated agent activity. Completion of the purchase displayed on the modal pop-up box may cause the request to be processed by one or more services or servers of the online retailer and a cookie to be returned along with the processed request. In various embodiments, the cookie may be transmitted to the customer 402 or the automated agent 406 even if the purchase is not completed, is completed unsuccessfully or if no interaction with the modal pop-up box occurs. The use of the cookie may then be tracked and used to further refine the bot detection models used by the bot detection service. Monitoring and tracking the use of cookies is described in greater detail below in connection with FIG. 7.

Figure 5:
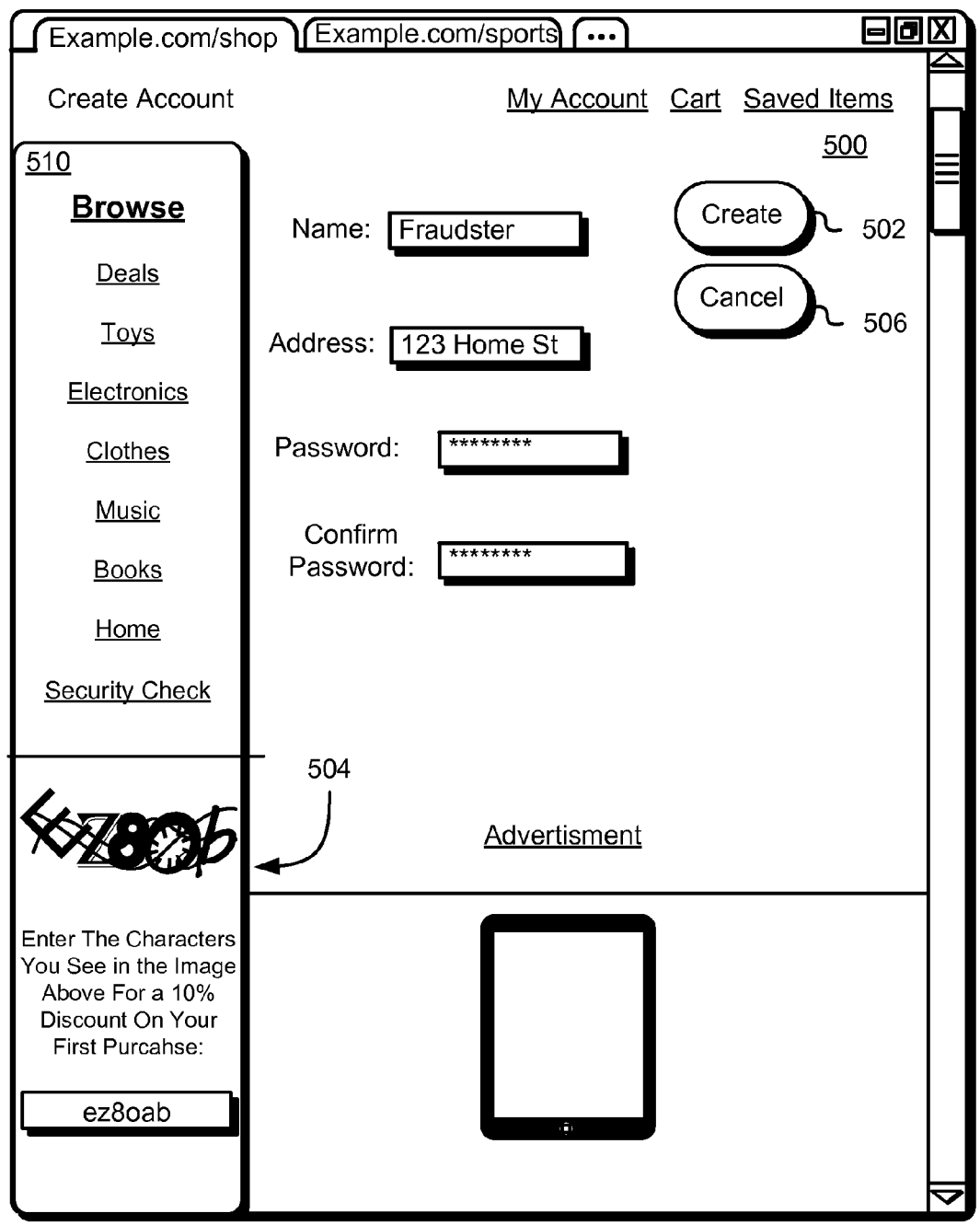
FIG. 5 illustrates a diagram of a webpage in accordance with various aspects of the present disclosure.

FIG. 5 shows a webpage 500 which may be displayed by an application executed by a computing device enabling a customer to interact with an electronic commerce website operated by an online retailer. As illustrated in FIG. 5, the webpage 500 includes various graphical user interface elements that enable navigation throughout the electronic commerce website of which the webpage 500 is a part. The webpage 500 may be displayed by various applications, such as a mobile application or web browser. In this example, the webpage 600 includes various navigational features. For instance, on the left-hand side of the webpage 500, various links 510 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 510 may cause an application displaying the webpage 500 to submit, pursuant to a URL associated with the selected link by the programming of the webpage 500, an HTTP request for the content associated with the link to a server that provided the webpage 500 or another server.

In this example, the webpage 500 also includes a graphical user element configured as a "create" button 502. The create button 502 may be a graphical user interface element of the webpage 500 where the underlying code of the webpage 500 is configured such that selection by an input device of the create button 502 causes information, inputted into webpage 500, corresponding to the creation of a customer account to be transmitted to one or more servers of the online retailer. Further, the create button 502 may be greyed out or otherwise rendered inactive until a security check 504 is completed in order to prevent automated agents from creating customer accounts with the online retailer. In this example, the security check 504 is displayed in a portion of the webpage 500 normally reserved for advertisements. In accordance with the present disclosure, the security check 504 may also be displayed in a modal pop-up box as described above in connection with FIG. 3. Furthermore, the security check may be any mechanism configured to receive human interaction.

The webpage 500 may also include a graphical user element configured as a "cancel" button 506. The cancel button 506 may be a graphical user interface element of the webpage 500 where the underlying code of the webpage 500 is configured such that selection by an input device of the cancel button 506 causes the process of creating a user account to be terminated. The webpage 500 may be caused to be displayed for a variety of reasons as described above in connection with FIGS. 2A-2C. For example, the webpage 500 may be displayed because the bot detection service indicated to the request routing service that a request may have been generated by an automated agent. The webpage 500 may also be displayed for a variety of other reasons. For example, the request routing service may require a CAPTCHA to be inserted into the webpage 500 at random, after processing a number of requests, at a particular time of day or year or any other reason suitable for mitigating automated agent activity. Completion of a security check 504 displayed on the webpage 500 may cause the request to be processed by one or more services or servers of the online retailer and the customer account to be created based at least in part on the information inputted into webpage 500.

The security check 504 displayed in the webpage 500 may be pre-generated and stored in one or more storage systems of the online retailer or may be generated upon receipt of the redirected request. The security check may also be partially pre-generated and completed upon receipt of the redirected request. For example, the rendering service may generate a framework for the security check including placeholders for images of items and text-entry fields where the response to the security check may be entered. Upon receipt of the tagged requests the rendering service may determine, based at least in part on the navigational history associated with the request, the most recently viewed items and include those items in the security check. The rendering service may determine items to include in the security check based at least in part on information in the customer's account history or the customer's navigational history in combination with other items, such as items that are viewed infrequently or items that have not been viewed by the customer.

As illustrated in FIG. 5, a non-blocking CAPTCHA may be presented in response to a request to create an account with the online retailer. The online retailer may take various mitigation actions based at least in part on the signal returned from the non-blocking CAPTCHA. For example, if the response to the non-blocking CAPTCHA does not include a CAPTCHA solution or other human interaction, the online retailer may prevent the creation of the customer account. Furthermore, if the online retailer prevents the creation of the customer account, the online retailer may also transmit an indication that the customer account has been created in order to prevent the automated agent from determining that the online retailer has detected the activity of the automated agent.

Figure 6:
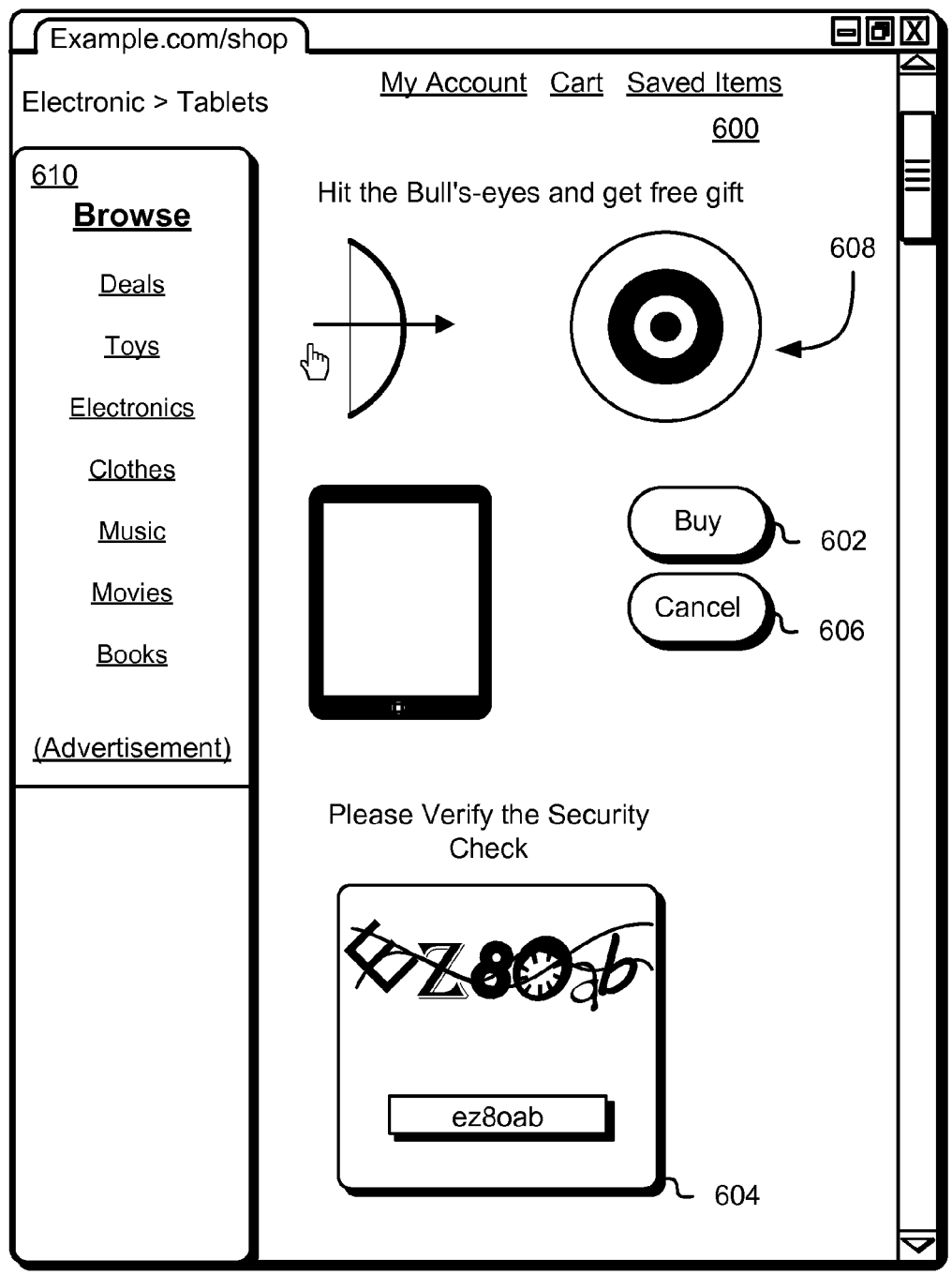
FIG. 6 illustrates a diagram of a webpage in accordance with various aspects of the present disclosure.

FIG. 6 shows an illustration of a webpage 600 including various graphical user interface elements that enable navigation throughout a website of which the webpage 600 is a part. In this example, the webpage 600 is part of an electronic marketplace of an online retailer providing goods and services as well as advertisements and other content. For instance, on the left-hand side of the webpage 600, various links 610 may link to one or more other webpages that contain additional content corresponding to department pages and/or category pages. In this example, the links appear as textual words which enable the links to be selected using an appropriate input device such as a keyboard, mouse, touchscreen or other input device. Selection of one of the links 610 may cause an application displaying the webpage 600 to submit, pursuant to a URL associated with the selected link by the programming of the webpage 600, an HTTP request for the content associated with the link to a server that provided the webpage 600 or another server. In this example, the webpage 600 also includes a graphical user element configured as a "buy" button 602. The buy button 602 may be a graphical user interface element of the webpage 600 where the underlying code of the webpage 600 is configured such that selection by an input device of the buy button 602 causes information corresponding to the security check 604 displayed on the webpage 600 to be transmitted to one or more servers of the online retailer. The buy button 602 may also be configured such that the button is inactive until a security check 604 is completed.

In this example, the webpage 600 contains a security check 604 and a game 608 in order to capture human interaction. In various embodiments, webpage 600 contains only the security check or the game in order to capture human interaction. The game 608 may be implemented in such a way that an automated agent may not interact with the game or, if the automated agent does interact with the game, it is difficult for the automated agent to simulate a human interacting with the game. For example, the game illustrated in FIG. 6 contains a simulated bow and arrow along with a target, a user interacting with the game 608 may use an input device such as a mouse to aim and fire the bow and arrow at the target. A human playing the game may have difficulties being accurate over multiple attempts at hitting the target. However, an automated agent may have difficulties simulating the inaccuracy of a human interacting with the game. An automated agent may exhibit the same interaction with the game over multiple attempts. A variety of different games may be used in accordance with the present disclosure such as word games, reaction games, matching games or any other game suitable for detecting automated agent activity. A signal received by the online retailer indicating that the game 608 has received one or more interactions may indicate that the webpage 600 was transmitted in response to a request generated based at least in part by the operation of a human.

The security check 604 and/or the game 608 may be caused to be displayed on the webpage 600 for a variety of reasons as described above in connection with FIGS. 2A-2C. For example, the routing service may tag a request based at least in part on the signature list and the policy service may cause the security check 604 and/or the game 608 to be displayed based at least in part on the tag. The rendering service may then obtain the security check 604 and/or the game 608 to be displayed to the customer on the webpage 600. The game 608 may also include one or more incentives to attract human interaction. For example, customers may be given a free gift of discount for achieving a certain score in the game or for setting the high score in the game. Furthermore, customers may be asked to compete in the game with other players and given promotional items for winning the game.

The webpage 600 may also be configured such that the game 608 and the security check 604 are rendered inactive or otherwise caused not to be displayed such as the inactive non-blocking CAPTCHA described above in connection with FIGS. 4A-4B. For example, the online retailer may suspect that automated agents are interacting with the game, in response, the online retailer may cause the webpage 600 to be displayed such that a client application displaying the webpage 600 would not display the game 608 and/or the security check 604. As a result, the automated agent may still interact with the game 608 and/or the security check 604 included in the code of the webpage 600. The online retailer may then receive a signal indicating that one or more interactions occurred with the game 608 and/or the security check 604 despite the webpage 600 being configured such that a client application displaying the webpage 600 would not display the game 608 and/or the security check 604. The online retailer may then increase the confidence level of the signature associated with the request for the webpage 600.

Figure 7:
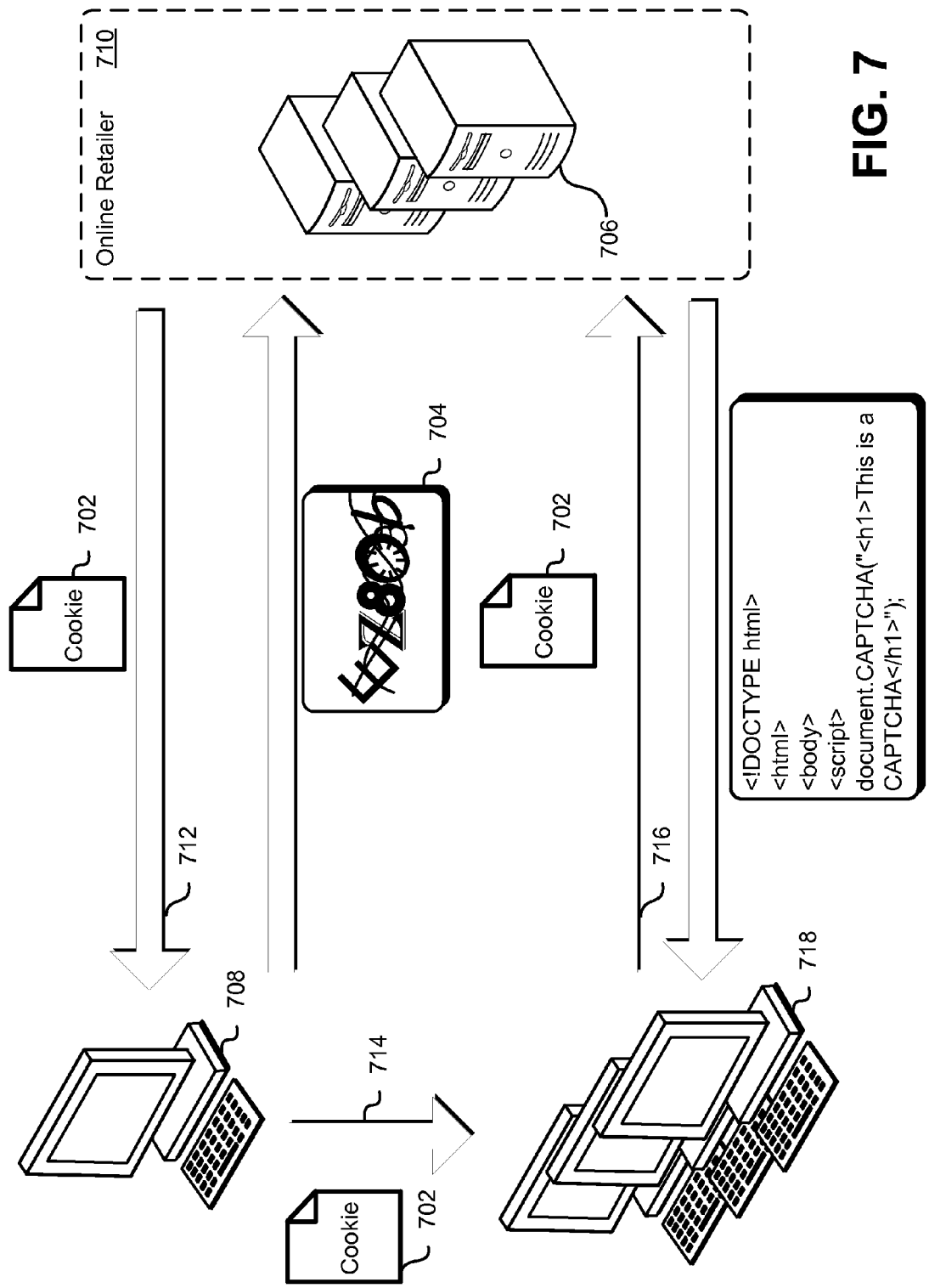
FIG. 7 illustrates an environment showing CAPTCHA cookies in accordance with various aspects of the present disclosure.

FIG. 7 shows an environment 700 in which an online retailer 710 may detect the activity of automated agents based at least in part on the use of a cookie 702 or similar token by the automated agents. The cookie 702 may be any parameter transmitted with the request that is capable of being tracked by the online retailer 710. The online retailer 710 may operate a website that provides an online marketplace where customers may purchase and offer for sale various goods and services. The online retailer 710 receives one or more requests to access resources of the online retailer at a request routing service 706. For example, an automated agent 708 may, using a computing device executing the automated agent 708, request a webpage containing information from the online retailer 710. The automated agent 708 executed by the computing device may transmit one or more HTTP requests to the request routing service 706 of the online retailer 710. The request routing service 706 may be a collection of computing resources collectively configured to receive HTTP requests and direct the HTTP requests to one or more other services of the online retailer 710. The request routing service 706 may also tag requests based at least in part on a signature list managed by the bot detection service.

The request routing service 706 may direct requests using HTTP redirect or other routing techniques. The request routing servicer 706 may be responsible for directing requests to the appropriate service of the online retailer 710 for processing. The request routing service 706 may tag requests as low confidence automated agent traffic, high confidence automated agent traffic or the request routing service 706 may not tag the request. The request routing service 706 may transmit the cookie 702 to the computing device executing the automated agent 708 over the connection 712. The online retailer 710 may monitor the total number of cookies 702 issued using a maximum cookie counter or similar mechanism for tracking the total number of cookies 702 issued at any given time period. For example, cookies 702 may be throttled in order to limit automated agents' abilities to utilize cookies 702 to avoid blocking CAPTCHA. The cookies 702 may be configured with a time to live and expire at the termination of the time to live. For example, automated agents' use of cookies 702 may be reduced by setting a maximum number of cookies 702 that can be issued at any given time and limiting the cookies' 702 validity to a limited period.

Returning to FIG. 7, connection 712 may be any suitable connection for transmitting communications between computer systems or within the same computer system such as a network, private network, virtual private network, inter-process communications, service call, function call or other connection. For example, the request routing service 706 may transmit the cookie 702 in response to the automated agent 708 submitting a solution to a CAPTCHA 704 regardless of whether the CAPTCHA 704 was solved correctly or incorrectly.

The cookie 702 may be configured to enable access to one or more resources of the online retailer 710 when submitted with a request to the request routing service 706. The automated agent 708 may share the cookie 702 over a connection 714 with one or more other automated agents 718. The connection 714 may be any suitable connection for transmitting communications between computer systems or within the same computer system such as a network, private network, virtual private network, inter-process communications, service call, function call or other connection. For example, the one or more other automated agents 718 may be executed by one or more virtual machines operating on the same computing device as automated agent 708. The one or more other automated agents 718 may use the cookie 702 in order to access one or more resources of the online retailer 710 by submitting the cookie 702 with multiple HTTP requests to the request routing service 706. The request routing service 706 or one or more other services of the online retailer 710 may track the use of the cookie 702 and determine, based at least in part on the frequency and the number of requests that include the cookie 702, that the cookie 702 was submitted by an automated agent. The bot detection service may then update the signature list based at least in part on the signature associated with the HTTP requests submitted with the cookie 702.

Figure 8:
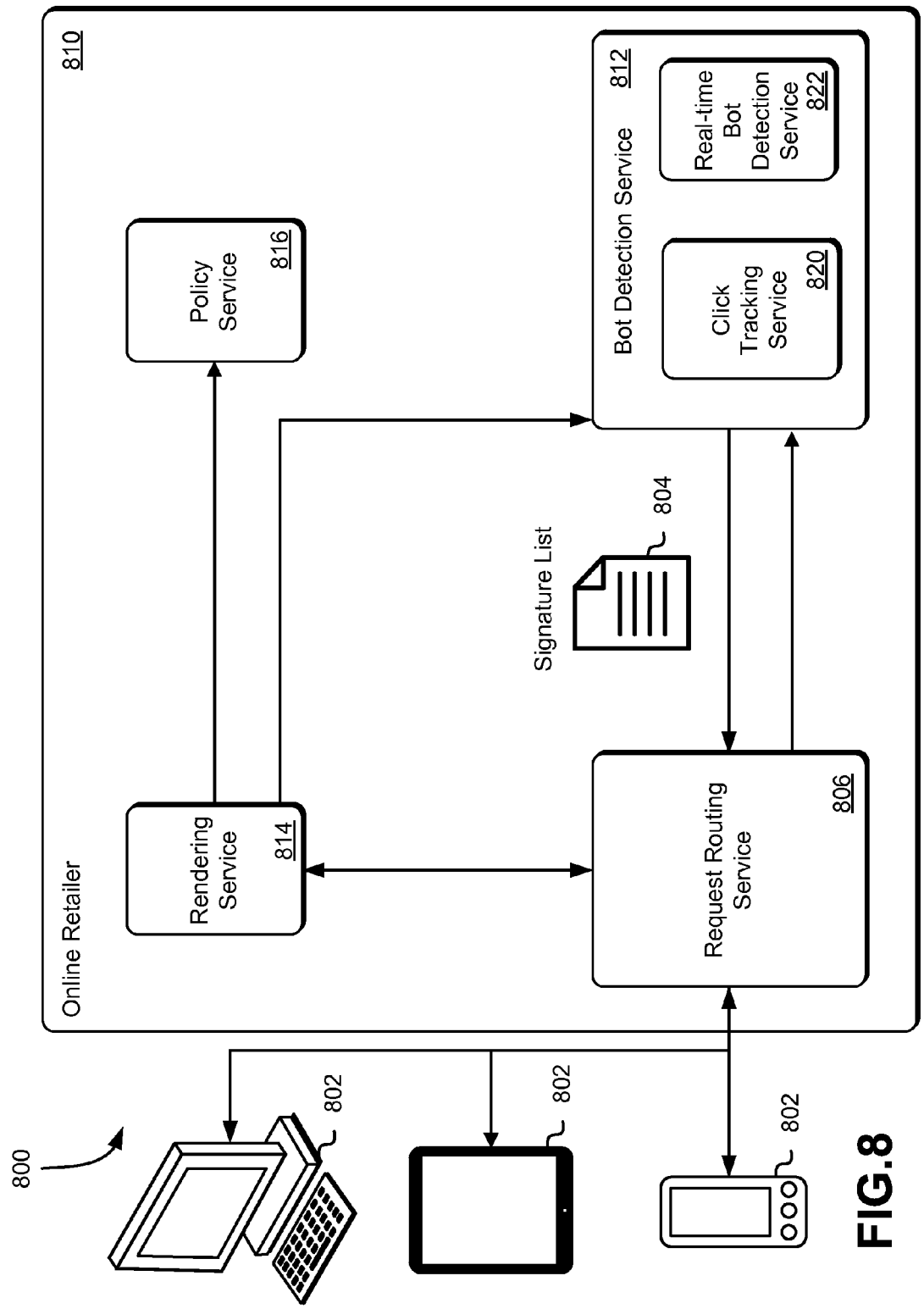
FIG. 8 illustrates an environment showing an online retailer in accordance with various aspects of the present disclosure.

FIG. 8 shows an environment 800 in which customers can connect to an online retailer 810 in order to interact with an electronic marketplace operated by the online retailer 810. Customers can connect to the online retailer 810 through one or more computing devices 802. The computing device 802 may include personal computers, smartphones, tablets or any other computing device capable of connecting to the online retailer 810. The computing device may transmit data over a network to a request routing service 806 operated by the online retailer 810. The request routing service 806 may direct communications (also referred to as requests) from the computing device 802 to the appropriate service of the online retailer 810. For example, the request routing service

806 may direct all webpage requests to a rendering service 814 in order to render and transmit the webpage in response to the request submitted by computing device 802. The request routing service 806 may also transmit communications received from the computing device 802 to a bot detection service 812. The bot detection service 812 may contain one or more other services to enable detection of communications transmitted by one or more automated agents. The bot detection service 812 may also receive information corresponding to the communications received from computing device 802 from the rendering service 814. The information may include signals received in response to webpages including the non-blocking CAPTCHA and the inactive non-blocking CAPTCHA. Furthermore, the bot detection service may also receive information corresponding to cookies or other tokens submitted with the requests from computing device 802.

The bot detection service 812 may contain a real-time bot detection service 822 and a click tracking service 820. The real-time bot detection service 822 may be a collection of computing resources collectively configured to calculate a score for one or more requests received from the request routing service 806, where the calculated score correlates to the probability of a particular request being generated by an automated agent. The real-time bot detection service 822 may determine the probability of a communication received from the request routing service 806 being generated by an automated agent near contemporaneously with receipt of the communication. For example, the real-time bot detection service 822 may determine the likelihood of a communication being generated by an automated agent based at least in part on the type of communication transmitted from the computing device 802.

The click tracking service 820 may be a collection of computing resources collectively configured to calculate a score for one or more requests based on a navigational history of the one or more requestors, where the score correlates to the probability of a particular request being generated by an automated agent. The click tracking service 820 may determine the probability of a communication being generated by an automated agent based at least in part on clickstream data. The clickstream data may include data corresponding to input received by one or more input devices such as a mouse or touchscreen and data corresponding to navigation history of the computing devices 802. For example, the click tracking service 820 may determine, based on the computing device 802, navigational history consisting entirely of webpages offering promotional items that the communication is likely generated by an automated agent.

The real-time bot detection service 822 or the click tracking service 820 may determine the probability of a particular communication being generated by an automated agent and return the probability to the bot detection service 812. The bot detection service 812 may then generate a signature list 804 based at least in part on the information received from the real-time bot detection service 822 and the click tracking service 820. The bot detection service 812 may then transmit a copy of the signature list 804 to the request routing service 806. The request routing service 806 may then use the signature list to tag the request before routing the request to the rendering service 814. The rendering service 814 may then transmit information corresponding to the tag included in the request to a policy service 816.

The policy service 816 may be a collection of computing resources collectively configured to determine whether to include a security check in response to a request and the type of security check to include. For example, the policy service 816 may be a computer system configured with a set of rules that indicate one or more actions to perform based at least in part on the confidence level associated with a particular request. The policy service 816 may receive a service call from the rendering service 814, including the request and the tag. The policy service 816 may then scan the set of rules to determine an action associated with the tag. The policy service 816 may also perform periodic tests in order to determine the accuracy of the bot detection models used by the bot detection service 812. Furthermore, the determinations of the policy service 816 may be informed by a human operator. For example, an administrator of the online retailer 810 may cause the policy service 816 to perform one or more tests or take a particular action based on a tagged request.

The rendering service 814 may receive information from the policy service 816 indicating one or more security checks to include in response to the request. For example, the policy service may indicate to the rendering service to include a non-blocking CAPTCHA, as described above in connection with FIG. 3, in response to the request. The rendering service 814 may generate a webpage to transmit in response to the request. The rendering service 814 or the request routing service 806 may transmit the webpage to the computing device 802. The request routing service 806 may then transmit a signal received in response to the webpage to the rendering service 814 and/or the bot detection service 812. The signal may include another HTTP request including one or more parameters. The bot detection service 812 may then use the signal to update the signature list 804 and transmit the updated signature list 804 to the request routing service 806. For example, the signal may indicate that the request received from the computing device 802 was generated at least in part by a human and the bot detection service 812 may reduce the confidence level of the signature associated with computing device 802.

Figure 9:
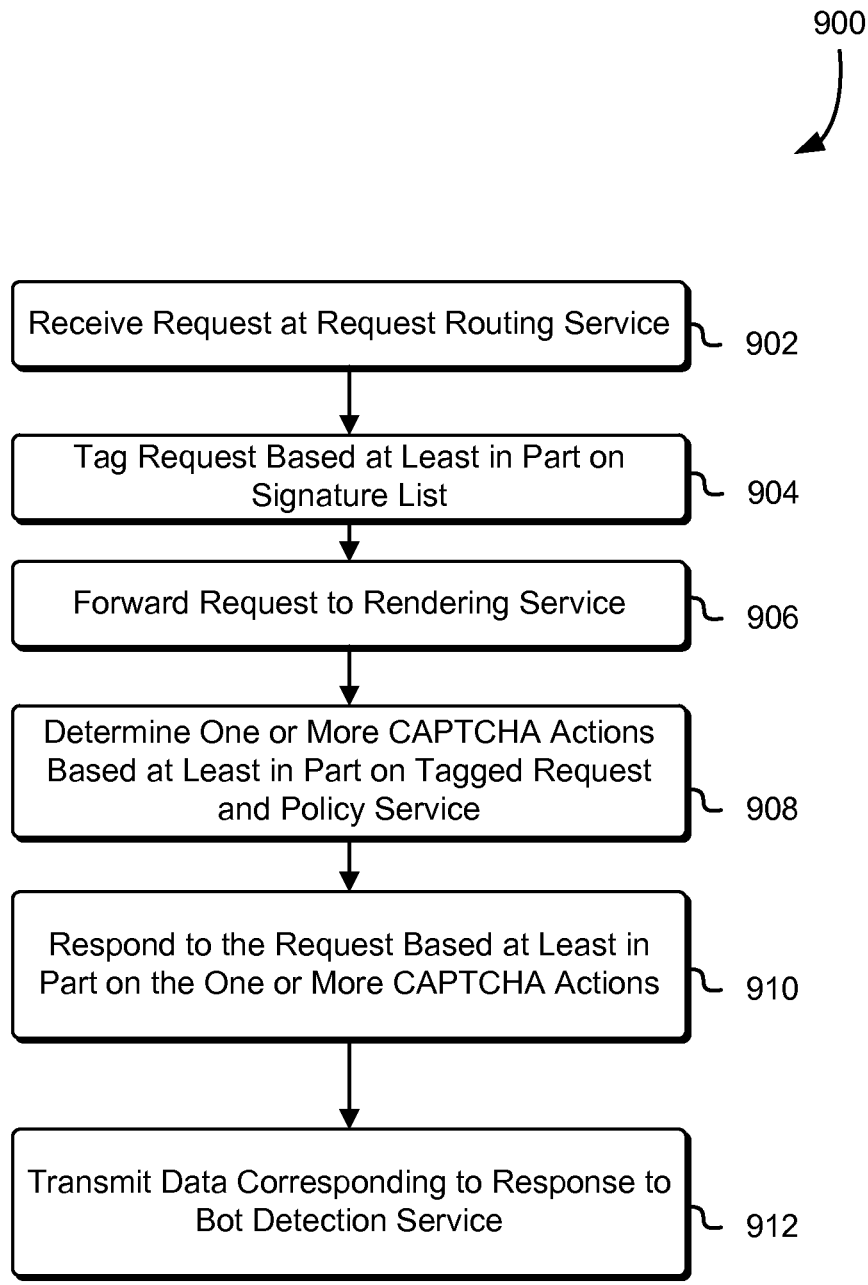
FIG. 9 illustrates an example of a process for telling humans and bots apart in accordance with at least one embodiment.

FIG. 9 shows an illustrative example of process 900 which may be used to detect an automated agent and determine the false positive rate of one or more detection models used by a bot detection service. The process 900 may be performed by any suitable system such as the request routing service 806 and the rendering service 814, described above in connection to FIG. 8. Returning to FIG. 9, in an embodiment, the process 900 includes receiving a request at a request routing service 902. The requests may be received by a request routing service operated by the online retailers as described above in connection with FIG. 8. The request received at the request routing service may be generated by an automated agent and may include a cookie. The requests may then be tagged based at least in part on the signature list 904. The signature list may be generated by the bot detection service described above in connection with FIG. 8. The signature list may include a list of IP addresses for the computing device suspected of executing automated agents.

The tags may be included as a parameter to an HTTP redirect request transmitted to the rendering service. The requests, including the tag, may be forwarded to a rendering service 906. The tag may indicate the confidence level corresponding to the signature of the computing device responsible for submitting the request. Once received by the rendering service, information corresponding to the tag may be transmitted to the policy service in order to determine one or more CAPTCHA actions based at least in part on a tag 908. For example, the tag information may indicate that the bot detection service has determined that the computing device responsible for the request is an automated agent with a high confidence level. The policy service may then determine to include a particular type of CAPTCHA in order to block the automated agents' access to the resources of the online retailer.

The policy service may also determine to present the suspected automated agent with a non-blocking CAPTCHA in order to collect more information corresponding to the computing device and the suspected automated agent. For example, the policy service may determine to present in response to the request a webpage configured to include a CAPTCHA and to respond to a CAPTCHA solution with a cookie regardless of whether the solution is correct. This may enable the bot detection service to determine if the request is associated with an automated agent and detect other automated agents based on the use of the cookie. The policy service may transmit one or more CAPTCHA actions to be included in the response to the request to the rendering service. The rendering service may then obtain the response and transmit the response including the one or more CAPTCHA actions 910. For example, the rendering service may receive from the policy service an indication to include an inactive non-blocking CAPTCHA in a webpage to be transmitted in response to a request. The rendering service may then obtain the webpage to be transmitted in response to the request and configure the webpage such that the security check contained in the code for the webpage is rendered inactive. The rendering service or some other service of the online retailer may then transmit data corresponding to the response to the bot detection service 912. The data corresponding to the response may indicate a particular CAPTCHA action included in the response, a particular signature associated with the response or any other data suitable for use in detecting automated agent activity. The data may be used to track responses to the one or more CAPTCHA actions and update the bot detection service based at least in part on responses. The responses may include not receiving a response to the one or more CAPTCHA actions. For example, an automated agent may receive a security check included in a modal dialog box, the automated agent may be configured to ignore or otherwise not transmit a response to the security check included in the modal dialog box. The bot detection service may then determine that no response to the security check included in the modal dialog box was received and update the automated agent detection model based at least in part on not receiving a response to the security check included in the modal dialog box. Furthermore, updating the bot detection service may include updating the collection of signatures included in the signature list by at least modifying the confidence level associated with one or more signatures in the collection of signatures, updating one or more automated agent detection models, defining one or more new automated agent detection models or other actions suitable for detecting automated agent activity.

Figure 10:
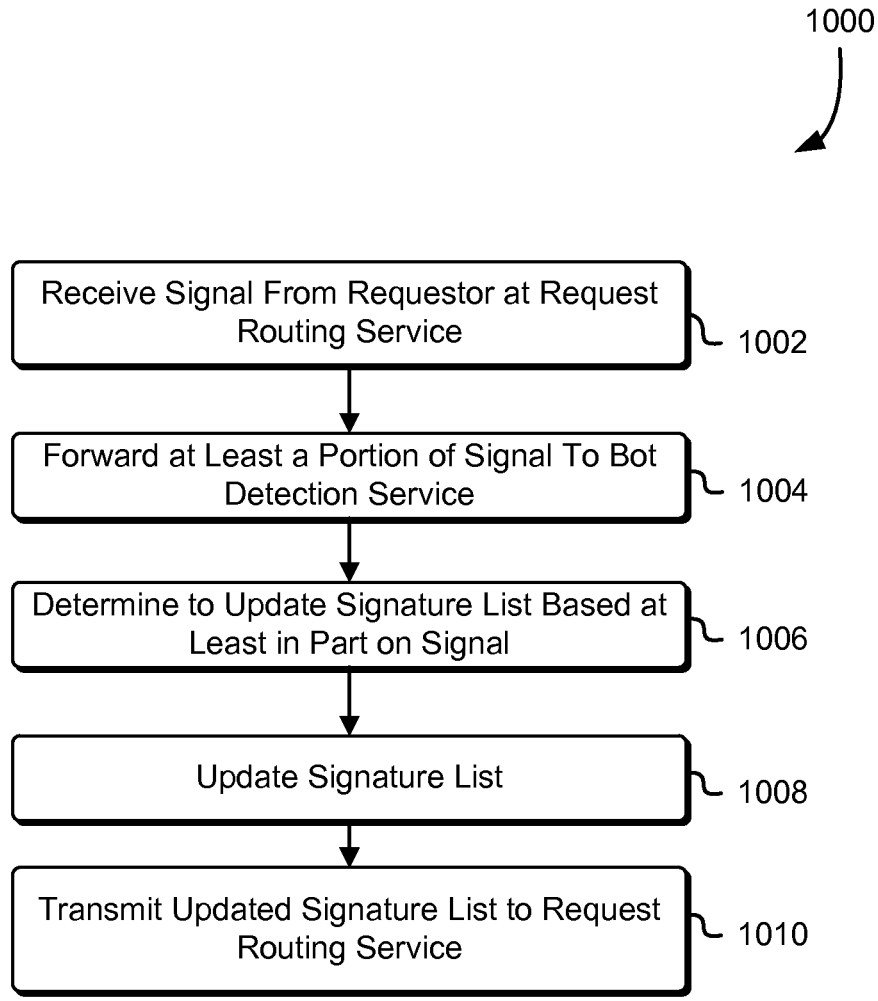
FIG. 10 illustrates an example of a process for telling humans and bots apart in accordance with at least one embodiment.

FIG. 10 shows an illustrative example of process 1000 which may be used to improve automated agent detecting based at least in part on signals received from requestors accessing one or more resources of the online retailer. The process 1000 may be performed by any suitable system such as the request routing service 806 and the bot detection service 812, described above in connection to FIG. 8. Returning to FIG. 10, in an embodiment, the process 1000 includes receiving a signal from a requestor at the request routing service 1002. The signal may be received in response to a webpage transmitted by the rendering service to a requestor. The signal may be any information received from the requestor capable of indicating one or more interactions with the webpage transmitted in response to the request, such as the signals described above in connection with FIGS. 2A-2C. For example, the webpage may include code that enables the online retailer to receive information corresponding to the requestors' interaction with the webpage including mouse movement or keystrokes. Interactions with the webpage may also include selecting a link one the webpage, playing a game on the webpage, providing a solution to a security check included in the webpage or any other interaction the customer may take with the webpage.

The signal or a portion thereof may be transmitted to a bot detection system 1004. The request routing service may forward the signal to the bot detection system. In various embodiments, the signal is included in a request to the online retailer and the request routing service directs the request to the rendering service, the rendering service then extracts the signal from the request and transmits the signal to the bot detection system. For example, the request may include a cookie and the rendering service may extract information from the cookie capable of identifying the requestor and transmit the information to the bot detection service. With the information corresponding to the cookie, the bot detection service may further refine the detection models used. The bot detection service may receive information from the request routing service and/or the rendering service and determine to update the signature list based at least in part on the received signals 1006.

For example, the signal may indicate that the requestor performed one or more interactions with an inactive CAPTCHA contained on a webpage. Based at least in part on the one or more interactions, the bot detection service may increase the confidence level of the signature associated with the particular requestor in the signature list. The bot detection system may correlate multiple signals and may further wait to receive multiple signals before updating the signature list. For example, the bot detection service may wait until a signal from a non-blocking CAPTCHA and an inactive non-blocking CAPTCHA are received before determining to update the signature list. The bot detection system may then update a signature list 1008 or cause another service of the online retailer to update the signature list. Once updated, the signature list may be transmitted to the request routing service 1010. For example, the bot detection service may update the signature list and transmit the list to the request routing service and indicate that the transmitted signature list is an update for one or more previous signature lists. In various embodiments, the bot detection system transmits information to the request routing service causing the request routing service to make one or more updates to the signature list.

Figure 11:
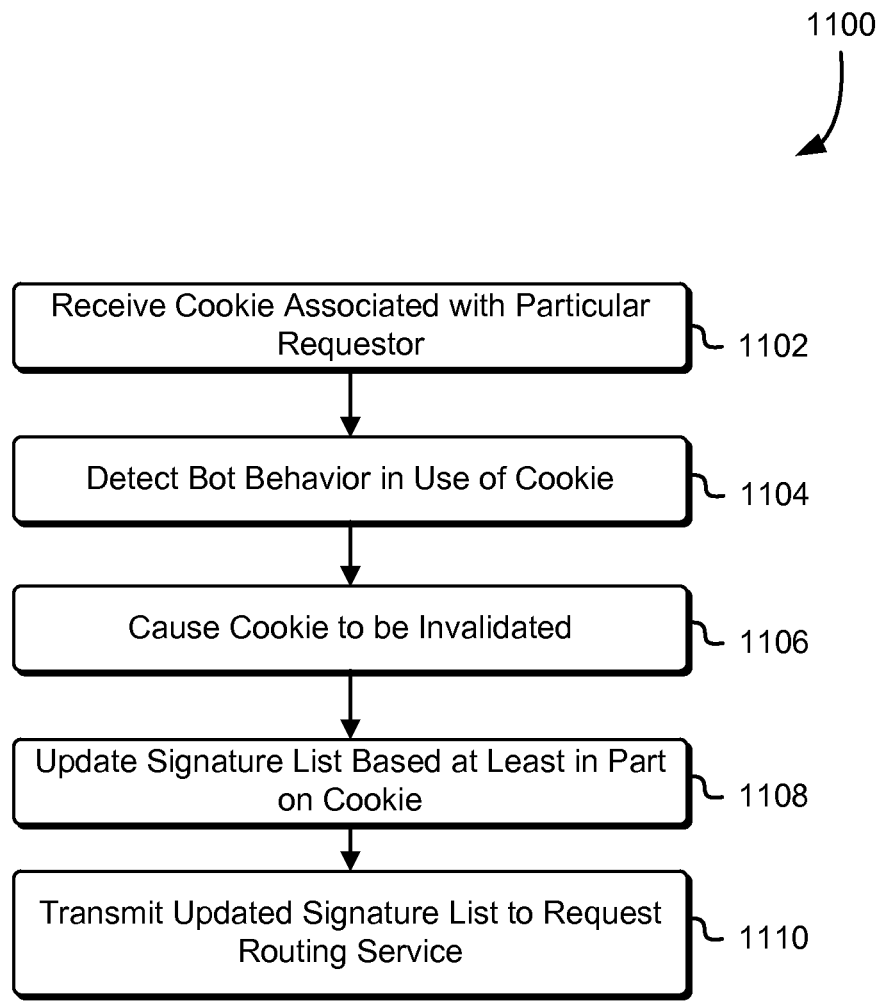
FIG. 11 illustrates an example of a process for telling humans and bots apart in accordance with at least one embodiment.

FIG. 11 shows an illustrative example of process 1100 which may be used to detect automated agent activity based at least in part on the use of one or more cookies. The process 1100 may be performed by any suitable system such as the request routing service 806 and the bot detection service 812 described above in connection to FIG. 8. Returning to FIG. 11, in an embodiment, the process 1100 includes receiving a cookie associated with a particular request 1102. The cookie may be associated with a particular CAPTCHA solution or a particular incorrect CAPTCHA solution. Furthermore, the cookie may be valid for a certain period of time or for a certain number of uses. The cookie may be received at the request routing service in connection with a request for access to one or more resources of online retailer and transmitted to the rendering service for processing of the request. The rendering service may then forward the cookie or information associated with the cookie to the bot detection service.

The bot detection service may then detect automated agent activity based at least in part on the use of a cookie 1104. For example, the request routing service may receive multiple copies of the same cookie from different IP addresses. The bot detection service or one or more other services of the online retailer may cause the cookie to be invalidated 1106. The online retailer may maintain a list of active and valid cookies, the cookies may also be associated with a particular signature in the signature list. The bot detection service may then update the signature list based at least in part on information associated with the use of the cookie 1108. For example, the bot detection service may determine that a copy of the cookie has been received from multiple automated agents and increase the confidence level associated with the signature of each of the automated agents in the signature list. Once updated, the signature list may be transmitted to the request routing service 1110. For example, the bot detection service may update the signature list and transmit the list to the request routing service and indicate that the transmitted signature list is an update for one or more previous signature lists. In various embodiments, the bot detection system transmits information to the request routing service causing the request routing service to make one or more updates to the signature list.

Figure 12:
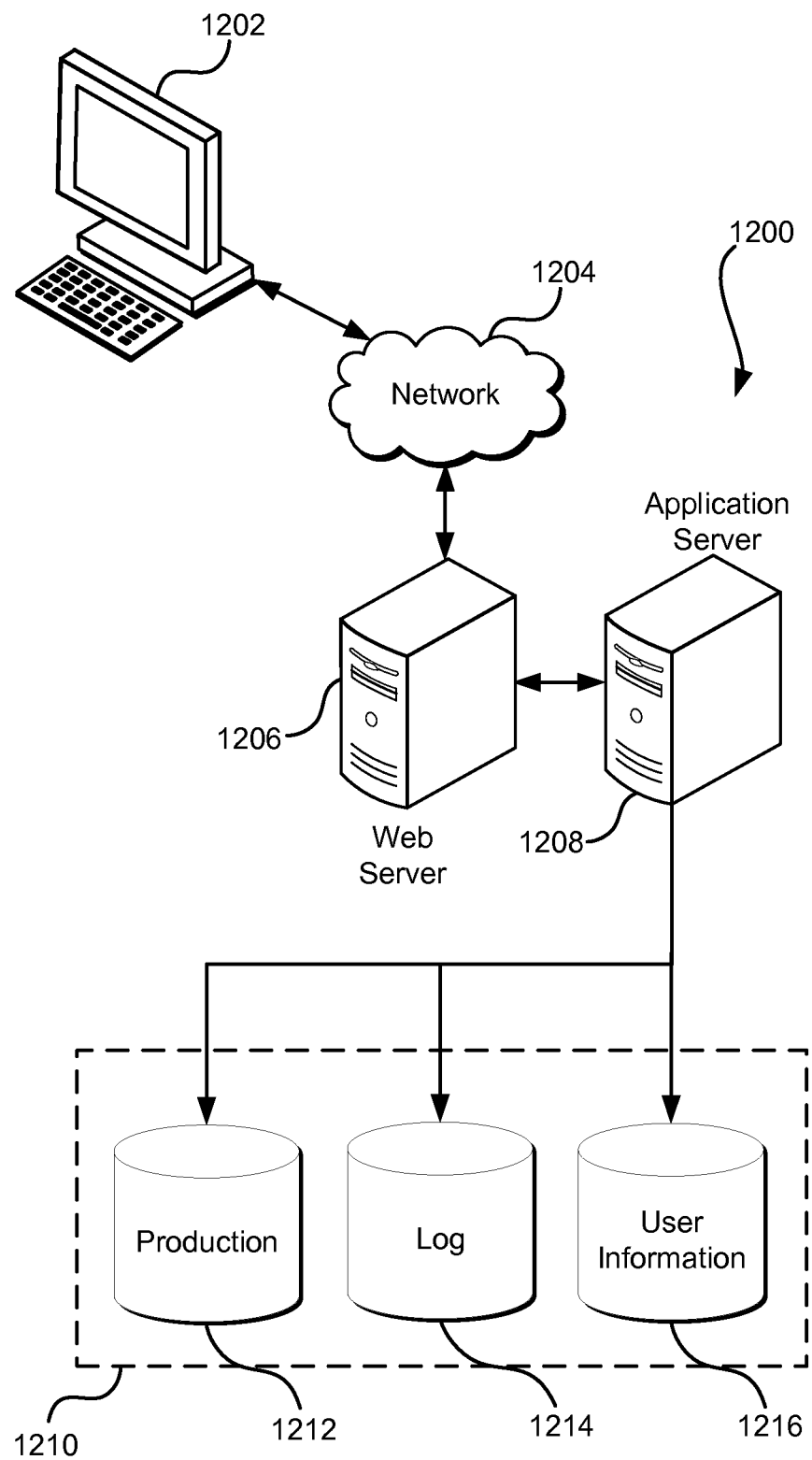
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

Embodiments of the disclosure can be described in view of the following clauses:

1. A computer-implemented method for presenting a non-blocking security check in response to requests to access one or more resources, comprising:
under the control of one or more computer systems configured with executable instructions,
receiving a request for a webpage;
processing the request at a rendering service by at least:
transmitting a service call to a policy service, the service call including information corresponding to the request; and
obtaining a security check indicated by the policy service in response to the service call, the security check configured to be used to distinguish humans from automated agents; and
configuring the webpage such that the security check is configured to appear in a modal pop-up box of the webpage and such that the webpage includes one or more uniform resource locators, separate from the modal pop-up box, that are inaccessible for selection by a user without clearing the modal pop-up box; and transmitting the webpage in response to the request.

2. The computer-implemented method of any of the preceding clauses, wherein the computer-implemented method includes:
receiving an indication of an interaction with the webpage; and
updating a collection of signatures based at least in part on the indication.

3. The computer-implemented method of any of the preceding clauses, wherein configuring the webpage includes configuring the webpage such that the webpage lacks uniform resource locators linking to information for which successful solution to the security check is required.

4. The computer-implemented method of any of the preceding clauses wherein the computer-implemented method further includes:
receiving an indication of an interaction with the webpage, the indication indicating interaction with the webpage without submission of a solution to the security check; and
updating a collection of signatures to increase a confidence level of a particular signature associated with the indication, based at least in part on the indication.

5. A system, comprising:
at least one computing device configured to implement one or more services, wherein the one or more services are configured to:
receive a request to access one or more resources of a service provider;
determine, in response to the request, to include a security check in a response to the request, the response also being configured to include one or more references to information that are unselectable by a user while the security check is displayed and the one or more references to information are obtainable by an automated agent;
transmit the response to the request;
at a time after transmitting the response to the request, make a determination whether the security check has been interacted with; and
perform one or more actions based at least in part on the determination.

6. The system of clause 5, wherein the one or more services are further configured to:
receive a second request including a solution to the security check; and
transmit a cookie in response to the second request regardless of whether the solution to the security check indicates automated agent activity, where the cookie is configured to allow access to the one or more resources of the service provider.

7. The system of clauses 5 or 6, wherein the determination of whether the security check has been interacted with is based at least in part on the second request.

8. The system of any of clauses 5-7 wherein the response is further configured to include one or more references to information that are unselectable by the user while the security check is displayed includes configuring the response to include a modal pop-up box containing the security check.

9. The system of any of clauses 5-8 wherein making the determination is based at least in part on receiving a second request referencing at least one of the references to information of the one or more references to information.

10. The system of any of clauses 5-9 wherein the at least one computing device configured to implement one or more services are further configured to:
tag the received request based at least in part on a collection of signatures; and
call a policy service responsible for determining to include the security check in the response to the request.

11. The system of any of clauses 5-10, wherein performing the one or more actions includes updating an automated agent detection model or a human user detection model based at least in part on the determination of whether the security check has been interacted with.

12. The system of any of clauses 5-11, wherein determining to include the security check in the response to the request is based at least in part on a test to determine a false positive rate of one or more automated agent detection models.

13. A non-transitory computer-readable storage medium having stored thereon executable instructions that, when executed by one or more processors of a computer system, cause the computer system to at least:
receive a request;
transmit a response to the request, the response being configured such that when rendered, the response provides a user interface that includes a security check and one or more references to information that are unselectable using the provided user interface as a result of the security check being present in the provided user interface and the one or more references to information are obtainable by an automated agent;
receive data indicating whether an interaction was performed with the security check; and
update a signature list based at least in part on whether the interaction was performed.

14. The non-transitory computer-readable storage medium of clause 13, wherein the instructions that cause the computer system to transmit the response to the request including the security check further include instructions that cause the computer system to configure the response such that the security check is displayed in a modal manner.

15. The non-transitory computer-readable storage medium of clauses 13 or 14 wherein the instructions that cause the computer system to receive data indicating whether the interaction was performed with the security check further include instructions that cause the computer system to receive data indicating the interaction was causing a modal pop-up box to be closed.

16. The non-transitory computer-readable storage medium of any of clauses 13-15 wherein the instructions that cause the computer system to update the signature list further include instructions that cause the computer system to increase a confidence level that a particular signature is associated with the automated agent.

17. The non-transitory computer-readable storage medium of any of clauses 13-16 wherein the instructions that cause the computer system to update the signature list further include instructions that cause the computer system to increase a confidence level that an IP address associated with a particular signature in the signature list is associated with the automated agent.

18. The non-transitory computer-readable storage medium of any of clauses 13-17, wherein the instructions that cause the computer system to update the signature list further include instructions that cause the computer system to associate a cookie with a particular signature in the signature list.

19. The non-transitory computer-readable storage medium of any of clauses 13-18 wherein the instructions that cause the computer system to receive the request further include instructions that cause the computer system to receive a cookie included in the request, where the cookie is associated with a solution of a particular security check.

20. The non-transitory computer-readable storage medium of any of clauses 13-19, wherein the instructions further comprise instructions that, when executed by the one or more processors, cause the computer system to detect automated agent activity based at least in part on the cookie included in the request.

21. A computer-implemented method, comprising:
under the control of one or more computer systems configured with executable instructions,
receiving a request for a webpage;
tagging the request based at least in part on a signature of the request and a collection of signatures, where the collection of signatures is a set of signatures and associated confidence levels;
determining a security check to include in the webpage based at least in part on the tagged request, where the security check is configured such that a client application displaying the webpage would not cause the security check to be displayed;
transmitting the webpage in response to the request;
determining whether an interaction with the security check included in the webpage has occurred; and
updating the collection of signature based at least in part on the determination.

22. The computer-implemented method of clause 21, wherein the interaction with the security check includes a solution to the security check included in the webpage.

23. The computer-implemented method of clauses 21 or 22, wherein updating the collection of signature includes modifying the confidence level associated with the signature corresponding to the request.

24. The computer-implemented method of any of clauses 21-23, wherein determining to include the security check in the webpage is based at least in part on receiving a certain number of security check solutions.

25. A system, comprising:
at least one computing device configured to implement one or more services, wherein the one or more services are configured to:
receive a network request;
render, based at least in part on the network request, a user interface including a security check, where the user interface is configured such that a client rendering the user interface does not display the security check;
determine if a solution to the security check is submitted; and
perform an action based at least in part on the determination.

26. The system of clause 25, wherein preforming the action includes updating a collection of signatures based at least in part on the determination.

27. The system of clauses 25 or 26, the collection of signatures includes an order list of network addresses, where the network addresses higher in the list correspond to a higher score of a particular network address corresponding to an automated agent.

28. The system of any of clauses 25-27, wherein the system updates the collection of signatures by increasing a confidence level associated with a particular signature of the collection of signature, where the system determines that the solution to the security check was submitted.

29. The system of clause 25-28, wherein the system updates the collection of signatures by decreasing a confidence level associated with a particular signature of the collection of signatures, where the system determines that no solution to the security check was submitted.

30. The system of any of clauses 25-29, wherein the system renders the user interface by obtaining an equivalent version of the user interface, wherein the equivalent version of the user interface is configured to display the security check and modifying the user interface such that the security check is rendered inactive and not caused to be displayed when the user interface is rendered.

31. The system of any of clauses 25-30, wherein the system renders the user interface based at least in part on a test implemented by a policy service, where the test is configured to determine a false positive rate of an automated agent detection model.

32. The system of any of clauses 25-31, wherein preforming the action includes updating the automated agent detection model based at least in part on the determination.

33. A non-transitory computer-readable storage medium having collectively stored thereon executable instructions that, when executed by one or more processors of a computer system, cause the computer system to at least:
receive a request for a resource;
select a user interface type to include in response to the request, wherein the selected user interface comprises one of:
a first type wherein one or more references to information are unselectable by a user while a security check is displayed and the one or more references to information are obtainable by an automated agent; or
a second type wherein the user interface includes the security check and is configured such that a client rendering the user interface does not display the security check;
generate, based at least in part on the selected type, the user interface; and
provide the user interface.

34. The non-transitory computer-readable storage medium of clause 33, wherein the instructions that cause the computer system to receive the request for the resource further include instructions that cause the computer system to generate a service call to a policy service, the policy service being responsible for determining the user interface to include in response to the request.

35. The non-transitory computer-readable storage medium of clauses 34 or 35, wherein the instructions that cause the computer system to receive the request further include instructions that cause the computer system to provide information corresponding to the request to an automated agent detection service.

36. The non-transitory computer-readable storage medium of any of clauses 33-35, wherein the instructions further comprise instructions that, when executed by the one or more processors, cause the computer system to:
receive a response to the user interface; and
perform an action based at least in part on the response.

37. The non-transitory computer-readable storage medium of any of clauses 33-36, wherein the instructions that cause the computer system to perform the action based at least in part on the response further include instructions that cause the computer system to update an automate agent detection model or a human user detection model based at least in part on the response.

38. The non-transitory computer-readable storage medium of any of clauses 33-37, wherein the instructions that cause the computer system to select a user interface type to include in response to the request further include instructions that cause the computer system to select the user interface type to include in the response based at least in part on a sampling rate of requests.

39. The non-transitory computer-readable storage medium of any of clauses 33-38, wherein the instructions that cause the computer system to select the user interface type to include in response to the request further include instructions that cause the computer system to select the user interface type to include in the response based at least in part on receiving a certain number of solutions to one or more previous security checks included in one or more previous user interfaces.

40. The non-transitory computer-readable storage medium of any of clauses 33-39, wherein the instructions that cause the computer system to select the user interface type to include in response to the request further include instructions that cause the computer system to selecting the user interface type to include in the response based at least in part on information associated with a requestor responsible for transmitting the request.

41. A computer-implemented method for detecting automated agent activity, comprising:
under the control of one or more computer systems configured with executable instructions,
receiving a solution to a security check, the security check configured to distinguish humans from automated agents;
determining whether the solution was submitted by an automated agent, based at least in part on a signature list and a first signature corresponding to the received solution, and if the signature list indicates a confidence level above a certain level transmitting a cookie in response to the solution, the cookie configured to enable access to one or more resources without an additional security check;
receive a plurality of requests including the cookie, where at least a subset of the plurality of requests are associated with one or more other signatures that are different from the first signature;
detecting automated agent activity based at least in part on the subset the plurality of requests associated with one or more other signatures; and
updating an automated agent detection model based at least in part on the first signature and the one or more other signatures.

42. The computer-implemented method of clause 41, wherein transmitting the security cookie in response to the solution includes transmitting the security cookie in response to the solution being incorrect.

43. The computer-implemented method of clauses 41 or 42, wherein the received solution is the solution to a security check that is contained in code of a webpage but configured not to be displayed in the webpage.

44. The computer-implemented method of any of clauses 41-43 wherein the plurality of requests including the cookie includes one or more HTTP requests in which the cookie is included with the one or more HTTP requests.

45. A system, comprising at least one computing device configured to implement one or more services, wherein the one or more services are configured to:
transmit a token in response to an interaction with a security check included in a user interface of a service provider, where the token is configured to allow access to one or more resources of the service provider without receiving an additional security check in response to a request to access the one or more resources;
determine if one or more requests to access the one or more resources including the token have been received;
if at least one request including the token has be received, obtain a set of signatures associated with the at least one of requests; and
performing one or more actions based at least in part on the determination.

46. The system of clause 45, wherein performing one or more actions further includes associating the set of signatures with a confidence level indicating automated agent activity in response to receiving at least one request including the token.

47. The system of clauses 45 or 46, wherein the token further includes a cookie capable of being associated with the security check included in the user interface and being tracked across multiple requests by the service provider.

48. The system of any of clauses 45-47, wherein the received at least one request including the token further includes determining that the token included in the request was received from an automated agent responsible for interacting with the security check included in the user interface.

49. The system of any of clauses 45-48, wherein the at least one computing device configured to implement one or more services, is further configured to invalidate the token based at least in part on the received at least one request including the token.

50. The system of any of clauses 45-49, wherein transmitting the token in response to the interaction with the security check included in the user interface further includes incrementing a maximum token counter such that a maximum number of tokens issued does not exceed the maximum token counter.

51. The system of any of clauses 45-50, wherein the at least one computing device configured to implement one or more services, is further configured to:
determine at least a subset of the set of signatures associated with the at least one request where the service provider has additional information corresponding to a score indicating a particular signature of the subset of signatures being associated with an automated agent; and correlate the additional information with information corresponding to the at least one request in order to update the score of the particular signature being associated with an automated agent.

52. The system of any of clauses 45-51, wherein performing the one or more actions further includes updating a collection of signatures based at least in part on the updated score of the particular signature.

53. A non-transitory computer-readable storage medium having collectively stored thereon executable instructions that, when executed by one or more processors of a computer system, cause the computer system to at least:

receive an indication of a request including a token, where the token was issued in response to a security check;

receive second indication of at least one other request including the token;

detect automated agent activity based at least in part on the second indication of the at least one other request including the token; and update a collection of signatures to include a signature of the automated agent based at least in part on the detected automated agent activity.

54. The non-transitory computer-readable storage medium of clause 53, wherein the instructions that cause the computer system to update the collection of signatures to further include instructions that cause the computer system to associate the signature of the automated agent with a confidence level indicating automated agent activity.

55. The non-transitory computer-readable storage medium of clauses 53 or 54, wherein the instructions that cause the computer system to receive the indication of the request including the token further include instructions that cause the computer system to receive a cookie as the token.

56. The non-transitory computer-readable storage medium of any of clauses 53-55, wherein the instructions that cause the computer system to receive the second indication of the at least one other request including the token further include instructions that cause the computer system to invalidate the token.

57. The non-transitory computer-readable storage medium of any of clauses 53-56, wherein the instructions that cause the computer system to update the collection of signatures to further include instructions that cause the computer system to update the collection of signatures to include a second signature, the second signature corresponding to a second automated agent responsible for transmitting the solution to the security check.

58. The non-transitory computer-readable storage medium of any of clauses 53-57, wherein the instructions that cause the computer system to receive the second indication of the at least one other request including the token further include instructions that cause the computer system to receive the second indication of the at least one other request including the token from the same source responsible for transmitting the request including the token.

59. The non-transitory computer-readable storage medium of any of clauses 53-58, wherein the instructions that cause the computer system to update the collection of signatures to include the signature of the automated agent further include instructions that cause the computer system to provide the collection of signatures to a request processing service.

60. The non-transitory computer-readable storage medium of any of clauses 53-59, wherein the instructions that cause the computer system to update the collection of signatures to include the signature of the automated agent further include instructions that cause the computer system to obtain the signature of the automated agent from the token.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving a request for a webpage;
tagging the request based at least in part on a signature of the request and a collection of signatures, where the collection of signatures is a set of signatures and associated confidence levels;
determining a security check to include in the webpage based at least in part on the tagged request, where the security check is configured such that a client application displaying the webpage would not cause the security check to be displayed;
transmitting the webpage in response to the request;
determining whether an interaction with the security check included in the webpage has occurred; and
updating the collection of signature based at least in part on the determination.

2. The computer-implemented method of claim 1, wherein the interaction with the security check includes a solution to the security check included in the webpage.

3. The computer-implemented method of claim 2, wherein updating the collection of signature includes modifying the confidence level associated with the signature corresponding to the request.

4. The computer-implemented method of claim 1, wherein determining to include the security check in the webpage is based at least in part on receiving a certain number of security check solutions.

5. A system, comprising:
at least one computing device configured to implement one or more services, wherein the one or more services are configured to:
receive a network request;
render, based at least in part on the network request, a user interface including a security check, where the user interface is configured such that a client rendering the user interface does not display the security check;
determine if a solution to the security check is submitted; and
perform an action based at least in part on the determination.

6. The system of claim 5, wherein preforming the action includes updating a collection of signatures based at least in part on the determination.

7. The system of claim 6, the collection of signatures includes an order list of network addresses, where the network addresses higher in the list correspond to a higher score of a particular network address corresponding to an automated agent.

8. The system of claim 6, wherein the system updates the collection of signatures by increasing a confidence level associated with a particular signature of the collection of signature, where the system determines that the solution to the security check was submitted.

9. The system of claim 6, wherein the system updates the collection of signatures by decreasing a confidence level associated with a particular signature of the collection of signatures, where the system determines that no solution to the security check was submitted.

10. The system of claim 5, wherein the system renders the user interface by obtaining an equivalent version of the user interface, wherein the equivalent version of the user interface is configured to display the security check and modifying the user interface such that the security check is rendered inactive and not caused to be displayed when the user interface is rendered.

11. The system of claim 5, wherein the system renders the user interface based at least in part on a test implemented by a policy service, where the test is configured to determine a false positive rate of an automated agent detection model.

12. The system of claim 11, wherein preforming the action includes updating the automated agent detection model based at least in part on the determination.

13. A non-transitory computer-readable storage medium having collectively stored thereon executable instructions that, when executed by one or more processors of a computer system, cause the computer system to at least:
receive a request for a resource;
select a user interface type to include in response to the request, wherein the selected user interface comprises one of:
a first type wherein one or more references to information are unselectable by a user while a security check is displayed and the one or more references to information are obtainable by an automated agent; or
a second type wherein the user interface includes the security check and is configured such that a client rendering the user interface does not display the security check;
generate, based at least in part on the selected type, the user interface; and
provide the user interface.

14. The non-transitory computer-readable storage medium of claim 13, wherein the instructions that cause the computer system to receive the request for the resource further include instructions that cause the computer system to generate a service call to a policy service, the policy service being responsible for determining the user interface to include in response to the request.

15. The non-transitory computer-readable storage medium of claim 13, wherein the instructions that cause the computer system to receive the request further include instructions that cause the computer system to provide information corresponding to the request to an automated agent detection service.

16. The non-transitory computer-readable storage medium of claim 13, wherein the instructions further comprise instructions that, when executed by the one or more processors, cause the computer system to:
receive a response to the user interface; and
perform an action based at least in part on the response.

17. The non-transitory computer-readable storage medium of claim 16, wherein the instructions that cause the computer system to perform the action based at least in part on the response further include instructions that cause the computer system to update an automate agent detection model or a human user detection model based at least in part on the response.

18. The non-transitory computer-readable storage medium of claim 13, wherein the instructions that cause the computer system to select a user interface type to include in response to the request further include instructions that cause the computer system to select the user interface type to include in the response based at least in part on a sampling rate of requests.

19. The non-transitory computer-readable storage medium of claim 13, wherein the instructions that cause the computer system to select the user interface type to include in response to the request further include instructions that cause the computer system to select the user interface type to include in the response based at least in part on receiving a certain number of solutions to one or more previous security checks included in one or more previous user interfaces.

20. The non-transitory computer-readable storage medium of claim 13, wherein the instructions that cause the computer system to select the user interface type to include in response to the request further include instructions that cause the computer system to selecting the user interface type to include in the response based at least in part on information associated with a requestor responsible for transmitting the request.

* * * * *